United States Patent
Jung et al.

(10) Patent No.: US 10,652,830 B2
(45) Date of Patent: May 12, 2020

(54) METHOD AND APPARATUS FOR ESTABLISHING AND SIGNALING MAXIMUM TRANSMISSION POWER IN WIRELESS COMMUNICATION SYSTEM

(71) Applicant: Pantech Inc., Seoul (KR)

(72) Inventors: Myung Cheul Jung, Seoul (KR); Jae Hyun Ahn, Seoul (KR); Ki Bum Kwon, Seoul (KR); Kang Suk Huh, Seoul (KR)

(73) Assignee: Pantech Inc., Seoul (KR)

( * ) Notice: Subject to any disclaimer, the term of this patent is extended or adjusted under 35 U.S.C. 154(b) by 363 days.

(21) Appl. No.: 14/890,409

(22) PCT Filed: May 9, 2014

(86) PCT No.: PCT/KR2014/004133
§ 371 (c)(1),
(2) Date: Nov. 10, 2015

(87) PCT Pub. No.: WO2014/182108
PCT Pub. Date: Nov. 13, 2014

(65) Prior Publication Data
US 2016/0112966 A1 Apr. 21, 2016

(30) Foreign Application Priority Data

May 10, 2013 (KR) .................. 10-2013-0053459
Jan. 28, 2014 (KR) .................. 10-2014-0010872
Mar. 28, 2014 (KR) .................. 10-2014-0037185

(51) Int. Cl.
*H04W 52/14* (2009.01)
*H04W 52/02* (2009.01)
(Continued)

(52) U.S. Cl.
CPC ..... *H04W 52/146* (2013.01); *H04W 52/0238* (2013.01); *H04W 52/365* (2013.01);
(Continued)

(58) Field of Classification Search
CPC ............. H04W 52/146; H04W 52/247; H04W 52/0238; H04W 52/365; H04W 76/046;
(Continued)

(56) References Cited

U.S. PATENT DOCUMENTS 8,477,746 B2 * 7/2013 Nanba ................... H04J 3/00
370/336
8,724,550 B2 * 5/2014 Kone ................. H04L 5/001
370/328
(Continued)

FOREIGN PATENT DOCUMENTS

CN 201210076286 * 3/2012 .......... H04W 52/143
JP 2012-169939 9/2012
(Continued)

OTHER PUBLICATIONS

3GPP TSG-RAN WG2 Meeting #81 (R2-130225), presented at St. Julian's, Malta, Jan. 28-Feb. 1, 2013 as Agenda item: 7.2, having the Source: Huawei, HiSilicon; Title: Feasible scenarios and benefits of dual connectivity in small cell deployment and was presented as Document for: Discussion and Decision.*
(Continued)

*Primary Examiner* — Christopher P Grey
(74) *Attorney, Agent, or Firm* — H.C. Park & associates, PLC

(57) ABSTRACT

The present invention provides a method and an apparatus for establishing maximum transmission power. The present invention comprises: receiving an RRC message including a user equipment-specific maximum transmission power value established by a first base station or a second base
(Continued)

station; reestablishing maximum output power based on the user equipment specific maximum transmission power value; and simultaneously transmitting an uplink to the first base station or the second base station within the reestablished maximum output power. The user equipment-specific maximum transmission power value is established for each of the first base station and the second base station, and the sum of the user equipment-specific maximum transmission power value for the first base station and the user equipment-specific maximum transmission power value for the second base station is less than or equal to a maximum output power value for the user equipment.

16 Claims, 15 Drawing Sheets

(51) Int. Cl.
*H04W 52/36* (2009.01)
*H04W 16/32* (2009.01)
*H04W 76/15* (2018.01)

(52) U.S. Cl.
CPC ............ *H04W 16/32* (2013.01); *H04W 76/15* (2018.02); *Y02D 70/1262* (2018.01)

(58) Field of Classification Search
CPC . H04W 16/32; H04W 76/025; H04W 52/143; H04W 24/08; H04W 28/20; H04W 52/244; H04W 52/343; H04W 72/0413; H04W 72/0473; H04W 76/028; H04W 88/02; H04W 76/15; Y02B 60/50; H04L 5/00; H04L 5/0058; H04L 5/0094; H04L 2025/03802; Y02D 70/1262
See application file for complete search history.

(56) References Cited

U.S. PATENT DOCUMENTS

| | | | | |
|---|---|---|---|---|
| 8,934,362 | B2* | 1/2015 | Hsu | H04W 52/243 |
| | | | | 370/252 |
| 9,107,175 | B2* | 8/2015 | Kim | H04W 52/146 |
| 9,351,263 | B2* | 5/2016 | Sagae | H04W 52/34 |
| 10,237,832 | B2* | 3/2019 | Sagae | H04W 52/367 |
| 10,244,489 | B2* | 3/2019 | Loehr | H04W 52/34 |
| 2001/0027113 | A1* | 10/2001 | Hayashihara | H04W 52/367 |
| | | | | 455/522 |
| 2007/0049321 | A1 | 3/2007 | Usuda et al. | |
| 2007/0087772 | A1 | 4/2007 | Yi et al. | |
| 2007/0149227 | A1* | 6/2007 | Parizhsky | H04L 1/0026 |
| | | | | 455/509 |
| 2007/0161394 | A1* | 7/2007 | Kuroda | H04L 1/0015 |
| | | | | 455/522 |
| 2007/0195734 | A1* | 8/2007 | Das | H04L 5/0016 |
| | | | | 370/335 |
| 2008/0069039 | A1* | 3/2008 | Li | H04W 36/02 |
| | | | | 370/329 |
| 2008/0214182 | A1* | 9/2008 | Wang | H04B 7/2606 |
| | | | | 455/423 |
| 2009/0180414 | A1* | 7/2009 | Maeda | H04B 7/2643 |
| | | | | 370/311 |
| 2011/0280169 | A1* | 11/2011 | Seo | H04W 52/367 |
| | | | | 370/311 |
| 2012/0039205 | A1 | 2/2012 | Kogure et al. | |
| 2012/0044882 | A1* | 2/2012 | Kim | H04L 5/0058 |
| | | | | 370/329 |
| 2012/0064907 | A1* | 3/2012 | Jung | H04W 28/26 |
| | | | | 455/452.1 |
| 2012/0093020 | A1* | 4/2012 | Iwai | H04L 5/0007 |
| | | | | 370/252 |
| 2012/0099455 | A1* | 4/2012 | Morita | H04W 16/10 |
| | | | | 370/252 |
| 2012/0113845 | A1* | 5/2012 | Kim | H04L 5/0037 |
| | | | | 370/252 |
| 2012/0207089 | A1* | 8/2012 | Kone | H04L 5/001 |
| | | | | 370/328 |
| 2012/0207112 | A1* | 8/2012 | Kim | H04W 52/146 |
| | | | | 370/329 |
| 2012/0231834 | A1* | 9/2012 | Seo | H04W 52/32 |
| | | | | 455/522 |
| 2012/0257519 | A1* | 10/2012 | Frank | H04L 5/0035 |
| | | | | 370/252 |
| 2012/0329514 | A1* | 12/2012 | Noh | H04L 12/66 |
| | | | | 455/552.1 |
| 2013/0272231 | A1* | 10/2013 | Dinan | H04W 52/34 |
| | | | | 370/329 |
| 2014/0161111 | A1* | 6/2014 | Kim | H04W 56/0005 |
| | | | | 370/336 |
| 2014/0329551 | A1* | 11/2014 | Ryoo | H04W 52/146 |
| | | | | 455/522 |
| 2014/0369294 | A1* | 12/2014 | Seo | H04W 76/10 |
| | | | | 370/329 |
| 2015/0011167 | A1* | 1/2015 | Luo | H04W 52/143 |
| | | | | 455/67.11 |
| 2015/0031409 | A1* | 1/2015 | Ahn | H04W 52/146 |
| | | | | 455/522 |
| 2015/0195795 | A1* | 7/2015 | Loehr | H04W 52/06 |
| | | | | 455/522 |
| 2016/0330693 | A1* | 11/2016 | Hwang | H04W 52/146 |

FOREIGN PATENT DOCUMENTS

| | | |
|---|---|---|
| KR | 10-2007-0041214 | 4/2007 |
| KR | 10-2007-0068320 | 6/2007 |
| WO | 2010/125737 | 11/2010 |
| WO | WO 2015174733 A1 * 11/2015 ............ H04W 88/08 |

OTHER PUBLICATIONS

3GPP TSG-RAN WG2 Meeting #81 (R2-130055), presented at St. Julian's, Malta, Jan. 28-Feb. 1, 2013 as Agenda Item: 7.2, having the Source: CMCC; Titled: Discussions on some issues of dual connectivity and was presented as Document for: Discussion and Decision.*

International Search Report dated Aug. 12, 2014, in International Patent Application No. PCT/KR2014/004133.

* cited by examiner

METHOD AND APPARATUS FOR ESTABLISHING AND SIGNALING MAXIMUM TRANSMISSION POWER IN WIRELESS COMMUNICATION SYSTEM

This application is the National Stage of International Application No. PCT/KR2014/004133, filed on May 9, 2014, and claims priority from and the benefit of Korean Patent Application No. 10-2013-0053459, filed on May 10, 2013; Korean Patent Application No. 10-2014-0010872, filed on Jan. 28, 2014; and Korean Patent Application No. 10-2014-0037185, filed on Mar. 28, 2014, each of which is hereby incorporated by reference for all purposes as if fully set forth herein.

BACKGROUND

Field

The present invention relates to wireless communication, and more particularly, to a method and an apparatus for establishing maximum transmission power $P_{EMAX}$ and signaling the maximum transmission power to UE in a situation in which the UE is dually connected to a plurality of base stations.

Discussion of the Background

UE can perform wireless communication through one or more base stations among base stations constituting at least one serving cell. This is referred to as dual connectivity. In this case, one of a plurality of base stations which are physically or logically divided can be referred to as a central base station (alternatively, serving base station) and the other one can be referred to as a small base station (alternatively, non-serving base station).

The base station can use power headroom information of the UE in order to efficiently use resources of the UE. A power control technology is an essential core technology for minimizing interference elements and reducing consumption of a battery of the UE in order to efficiently distribute the resources in wireless communication.

When the UE provides the power headroom information to the base station, the base station can estimate maximum uplink transmission power which can be allocated to the UE. Accordingly, the base station can provide uplink scheduling such as transmission power control, modulation and coding levels, and a bandwidth to the UE within a range not to depart from a limit of the estimated maximum uplink transmission power.

When a scheduler is positioned in individual base stations while the UE simultaneously performs uplink transmission through two base stations, a scheduling situation between the base stations cannot be verified due to a difficulty in exchange of scheduling information between the base stations.

A base station in which the dual connectivity is configured configures the maximum transmission power $P_{EMAX}$ so as to prevent the maximum transmission power $P_{EMAX}$ from being over transmission power of a maximum capability of the UE at the time of configuring the maximum transmission power $P_{EMAX}$ and dedicated signaling is requested to the UE.

SUMMARY

The present invention has been made in an effort to provide a method and an apparatus for dedicatively configuring maximum transmission power $P_{EMAX}$ of a base station.

The present invention has also been made in an effort to provide a method and an apparatus in which the base station provides maximum transmission power dedicatively configured in the UE to the UE through dedicated signaling.

The present invention has also been made in an effort to provide a method and an apparatus for configuring maximum output power $P_{CMAX}$ of the UE dually connected to a small base station and a macro base station by using UE dedicated (specific) maximum transmission power $P_{EMAX}$ received through the dedicated signaling.

The present invention has also been made in an effort to prevent the UE from configuring transmission power of a capability or more.

In one aspect, a method for establishing maximum transmission power of UE dually connected to a first base station and a second base station is provided. The method includes: receiving a message including a UE-dedicated (specific) maximum transmission power ($P_{EMAX}$) value established in the first base station or the second base station; reestablishing maximum output power based on the UE-specific maximum transmission power value; and simultaneously transmitting an uplink to the first base station or the second base station within the reestablished maximum output power, wherein the UE-specific maximum transmission power value is established for each of the first base station and the second base station and the sum of the UE-specific maximum transmission power value for the first base station and the UE-specific maximum transmissions power value for the second base station is established to be equal to or smaller than the maximum output power of the UE.

In another aspect, UE dually connected to a first base station and a second base station and establishing maximum output power is provided. The UE includes: a receiving unit receiving a message including a UE specific maximum transmission power value established in the first base station or the second base station; a control unit reestablishing maximum output power based on the UE-dedicated (specific) maximum transmission power value; and a transmitting unit simultaneously transmitting an uplink to the first base station or the second base station within the reestablished maximum output power, wherein the UE-dedicated (specific) maximum transmission power value is established for each of the first base station and the second base station and the sum of the UE-dedicated (specific) maximum transmission power value for the first base station and the UE-dedicated (specific) maximum transmissions power value for the second base station is established to be equal to or smaller than the maximum output power of the UE.

According to exemplary embodiments of the present invention, a power headroom report can be efficiently transferred in a situation in which dual connectivity between a macro cell and a small cell, and UE is configured on a network.

Transmission power of a maximum capability of the UE or more can be prevented from being configured.

Although the UE is maximally allocated with a UL grant from a macro base station and a small base station due to dual connectivity, the UE can prevent a scaling down phenomenon by performing uplink transmission within a limit of maximum output power.

When each of a plurality of base stations manages a scheduler, the UE can transmit information on transmission power to be used in each base station dedicatively (specifically) for the UE so as to prevent a problem in that maximum transmission power is excessively configured.

DETAILED DESCRIPTION OF THE ILLUSTRATED EMBODIMENTS

Figure 1:
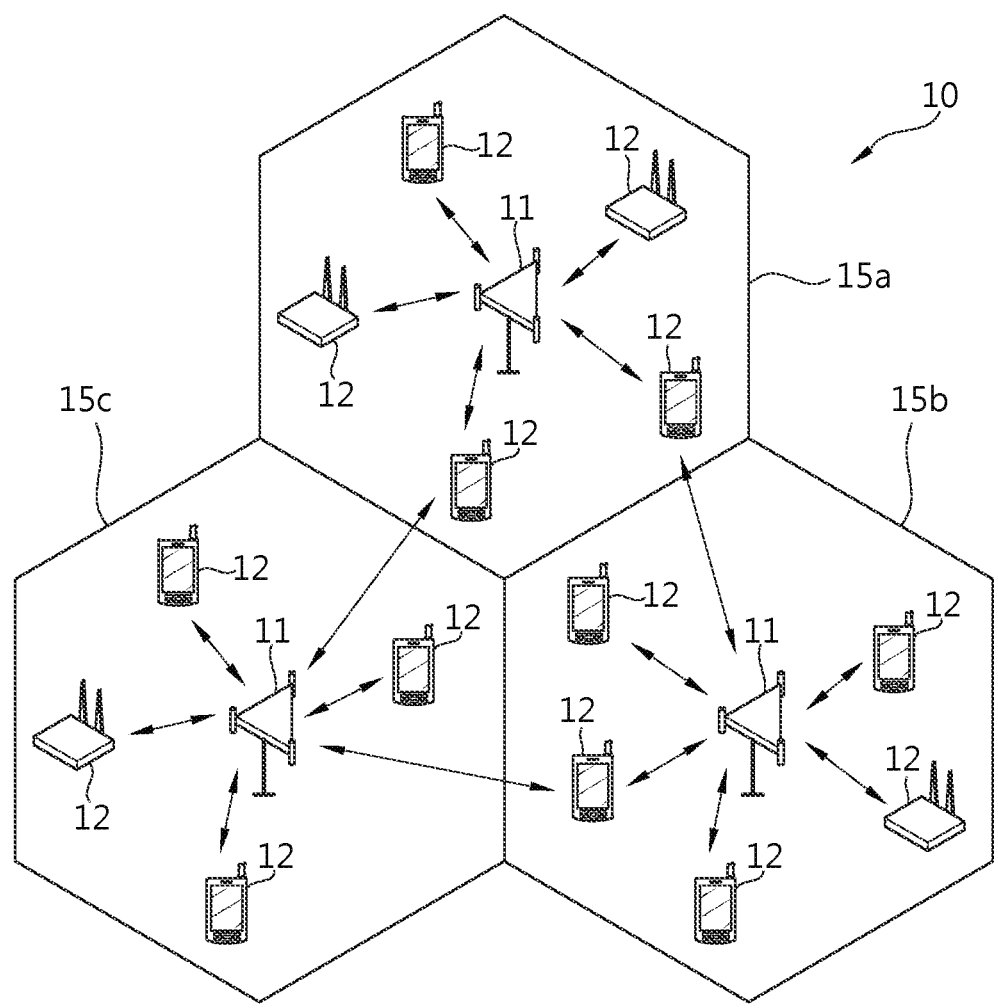
FIG. 1 illustrates a wireless communication system according to the present invention.

Hereinafter, in the specification, contents associated with the present invention will be described in detail through illustrated drawings and exemplary embodiments together with contents of the present invention. In the figures, even though the parts are illustrated in different drawings, it should be understood that like reference numbers refer to the same or equivalent parts of the present invention throughout the several figures of the drawing. In describing the embodiments of the present invention, when it is determined that the detailed description of the known art related to the present invention may obscure the gist of the present invention, the detailed description thereof will be omitted.

Further, a wireless communication network is described as target in the specification, and a work performed in the wireless communication network may be performed while a system (for example, a base station) that controls the corresponding wireless communication network controls the network and transmits data, or the work may be performed by UE coupled with the corresponding wireless network.

FIG. 1 illustrates a wireless communication system according to an exemplary embodiment of the present invention.

Referring to FIG. 1, a wireless communication system 10 is widely disposed to provide various communication services such as voice, packet data, and the like. The wireless communication system 10 includes at least one base station (evolved NodeB, eNB) 11. Each base station 11 provides a communication service to specific cells 15a, 15b, and 15c. The cell may be again divided into a plurality of areas (referred to as sectors).

A terminal (user equipment, UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 11 may be called other terms such as a base station (BS), a base transceiver system (BTS), an access point, a femto base station, a home nodeB, a relay, and the like. The cell needs to be analyzed as a comprehensive meaning representing a partial area covered by the base station 11 and embraces all of various coverage areas including a mega cell, a macro cell, a small cell, a micro cell, a pico cell, femto cell, and the like. The base station 11 may provide at least one cell to the UE. The cell may mean a geographical area where the base station 11 provides a communication service or a specific frequency band. The cell may mean a downlink frequency resource and an uplink frequency resource. Alternatively, the cell may mean a combination of the downlink frequency resource and an optional uplink frequency resource.

A downlink (DL) means communication from the base station 11 to the UE 12 and an uplink (UL) means communication from the UE 12 to the base station 11. In the downlink, a transmitter may be a part of the base station 11 and a receiver may be a part of the UE 12. In the uplink, the transmitter may be a part of the UE 12 and the receiver may be a part of the base station 11.

In the wireless communication system, various multiple access techniques may be used, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA.

Herein, a time division duplex (TDD) method technique in which transmission is performed by different times may be used or a frequency division duplex (FDD) technique in which transmission is performed by using different frequencies may be used, in uplink transmission and downlink transmission.

In a physical layer, physical control channels described below are used. A physical downlink control channel (PDDCCH) notifies resource allocation of a paging channel (PCH) and a downlink shared channel (DL-SCH) and hybrid automatic repeat request (HARQ) information associated with the DL-SCH to the UE. The PDCCH may transport a UL grant to notify resource allocation of the uplink transmission to the UE. The DL-SCH is mapped to a physical downlink shared channel (PDSCH). A physical control format indicator channel (PCFICH) notifies the number of OFDM symbols used in the PDCCHs to the UE, which is transmitted every subframe. A physical hybrid ARQ indicator channel (PHICH) transports an HARQ ACK/NAK signal as a response of the uplink transmission. A physical uplink control channel (PUCCH) transports uplink control information such as HARQ ACK/NAK, a scheduling request, a CQI for the downlink transmission. A physical uplink shared channel (PUSCH) transports an uplink shared channel (UL-SCH). A physical random access channel (PRACH) transports a random access preamble.

Meanwhile, a range of maximum output power PCMAX of the UE is shown in Equation given below.

$$P_{CMAX\_L} \leq P_{CMAX} \leq P_{CMAX\_H} \qquad \text{[Equation 1]}$$

Herein, $P_{CMAX\_L}$ and $P_{CMAX\_H}$ are defined as an equation given below.

$$P_{CMAX\_L}=\text{MIN}(P_{EMAX}-\Delta T_C, P_{POWERCLASS}-\text{MAX}(MPR+A\text{-}MPR, P\text{-}MPR)-\Delta T_c) \quad \text{[Equation 2]}$$

$$P_{CMAX\_H}=\text{MIN}(P_{EMAX}, P_{POWERCLASS}) \quad \text{[Equation 3]}$$

Where, $P_{EMAX}$ is maximum transmission power of the UE, which is permitted in the corresponding cell and is a value signaled in an upper layer (e.g., RRC signal). The $P_{EMAX}$ is a value specific for each cell by IE P-Max. $P_{POWERCLASS}$ represents maximum output power for a single class. MPR represents a power reduction value established in a range to satisfy requirements established by considering the corresponding band and modulation in the UE. A-MPR is a value established by the UE in a range indicated by the base station. P-MPR represents maximum output power reduction permitted by considering a case in which other system such as LTE, such as 1×RTT is operated. $\Delta T_C$ represents a fixed power offset value and a function of a transmission bandwidth (BW) for a component carrier.

Meanwhile, the base station may be divided into the macro base station, a pico base station, a femto base station, and the like according to coverage.

The macro base station as a generally used base station has larger coverage than the pico base station or the femto base station. Therefore, the macro base station transmits a signal with relatively strong power.

The pico base station which is a base station installed for a hotspot or a coverage hole has small coverage. The pico base station transmits the signal with relatively low power.

A cell provided by the macro base station is referred to as the macro cell and a frequency that supports the macro cell is referred to as a macro cell layer. The macro cell provides to the UE relatively more reliable connectivity than the cell provided by the pico base station or the femto base station.

The cell provided by the pico base station is referred to as the pico cell and the small cell in a sense that the coverage of the cell provided by the pico base station is small. Further, the pico base station is referred to as a small base station or a small cell base station. The small cell provides to the UE relatively less non-reliable connectivity than the macro cell.

In a network environment in which the macro cell and the small cell coexist, the macro cell and the small cell distribute traffic or transmit traffic of different QoS to enable more efficient wireless operation.

Figure 2:
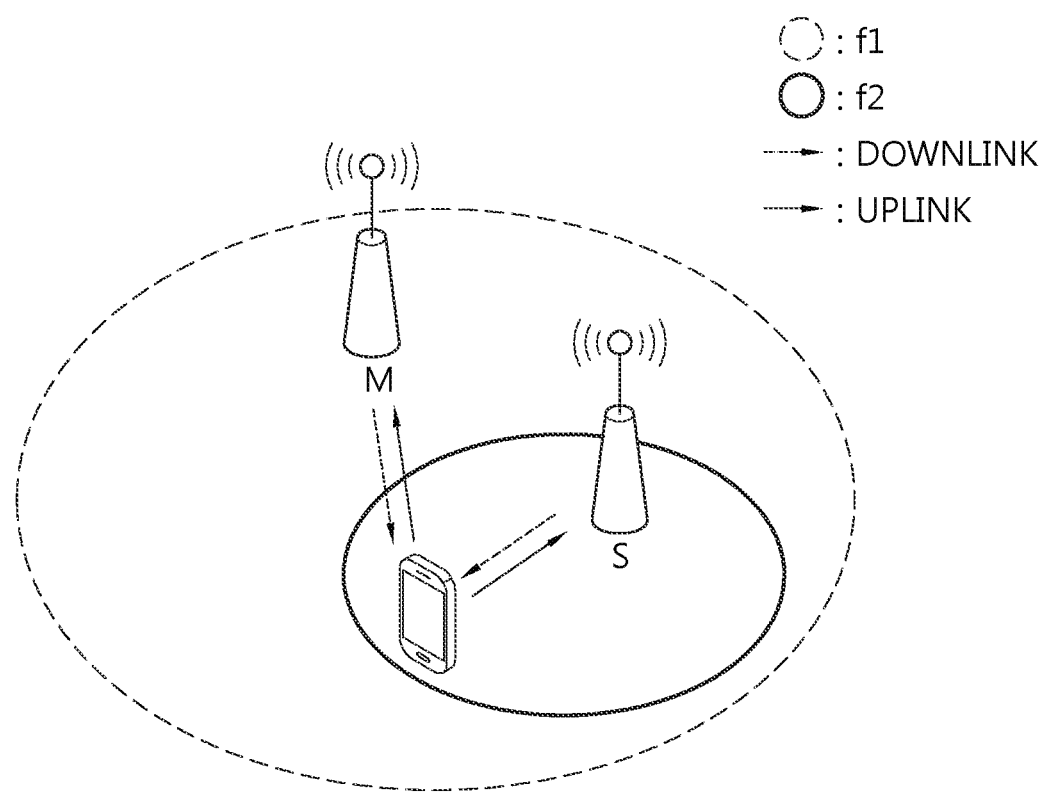
FIG. 2 illustrates one example of a dual connectivity situation to which the present invention is applied.

FIG. 2 illustrates one example of a dual connectivity situation to which the present invention can be applied. The dual connectivity means that the UE uses both the macro cell and the small cell in the network environment in which the macro cell and the small cell coexist. In other words, the dual connectivity may be an operation in which the UE established in a radio resource control (RRC) connected state with two or more different network points consumes radio resources provided by the network points. Herein, two or more different network points may be a plurality of base stations which are physically or logically divided. According to the dual connectivity, efficient network configuration and UE transmission/reception are enabled and distribution and transmission efficiency of the traffic may be improved.

Referring to FIG. 2 the UE may perform simultaneous UL transmission or simultaneous DL reception to or from a macro base station M and a small base station S. The macro base station M and the small base station S are connected through a backhaul, but a delay of 25 to 65 ms may occur in the case of an abnormal backhaul.

Although not clearly illustrated in FIG. 2, a structure may be established, in which each base station has one or more serving cells. For example, in the macro base station M, two serving cells may be configured and in the small base station S, three serving cells may be configured. In addition, the macro base station M and the small base station S may perform a dual connectivity service with respect to the UE. In the corresponding structure, the serving cells of each base station are grouped and is named as a cell group. Herein, the macro base station M as a base station serving as a master and is named as a master base station (master eNB, MeNB) and the group of the serving cells which the master base station provides to the UE may be referred to as a master cell group (MCG). Further, the small base station S as a base station serving as a sub and is named as a secondary base station (secondary eNB, SeNB) and the group of the serving cells which the secondary base station provides to the UE may be referred to as a secondary cell group (SCG).

Figure 3:
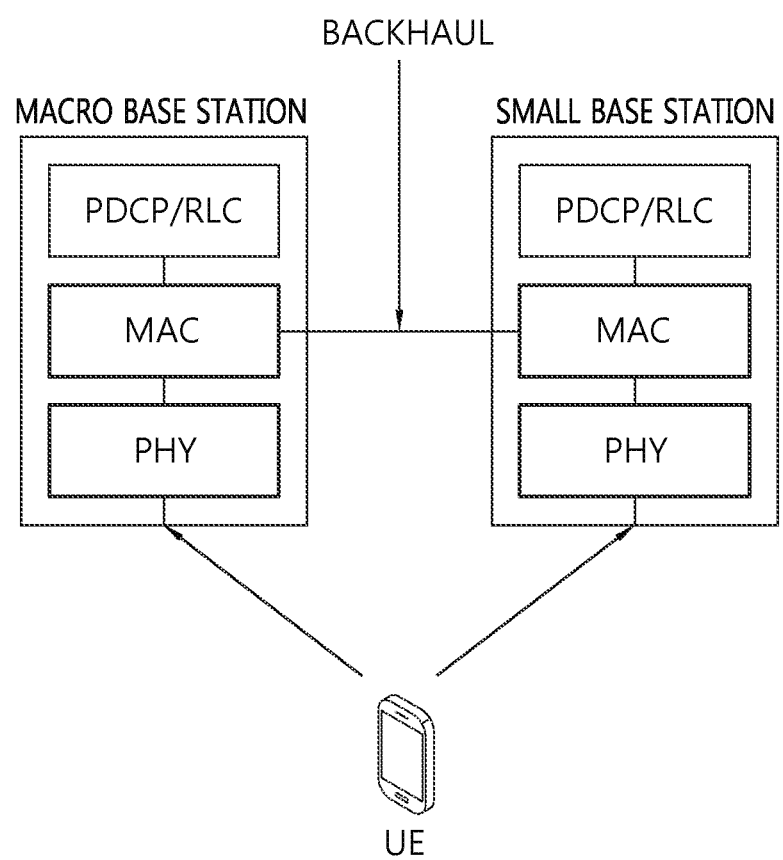
FIG. 3 illustrates one example of scheduler structures of two base stations dually connected to UE.

FIG. 3 illustrates one example of scheduler structures of two base stations dually connected to UE.

Referring to FIG. 3, the macro base station and the small base station individually have the schedulers and scheduling for UL transmission for each base station is individually managed. The macro base station and the small base station at least have a structure of a form in which a PHY layer and an MAC layer are independently configured. Alternatively, a PDCP layer and an RLC layer may be positioned in each base station or only in the macro base station.

Due to the delay time of the abnormal backhaul connection between the macro base station and the small base station may not share schedule information with each other. In this case, the macro base station and the small base station may not know UL grant information of a counterpart.

The base station determines a UL grant so as to maximize transmission efficiency. For example, the base station may allocate the UL grant by considering the sum (that is, total power headroom information) of power headroom information for all base stations transmitted by the UE.

When a UL grant having a magnitude of maximum output power or more is allocated to the UE, scaling-down of UL transmission power of the UE may occur.

Figure 4:
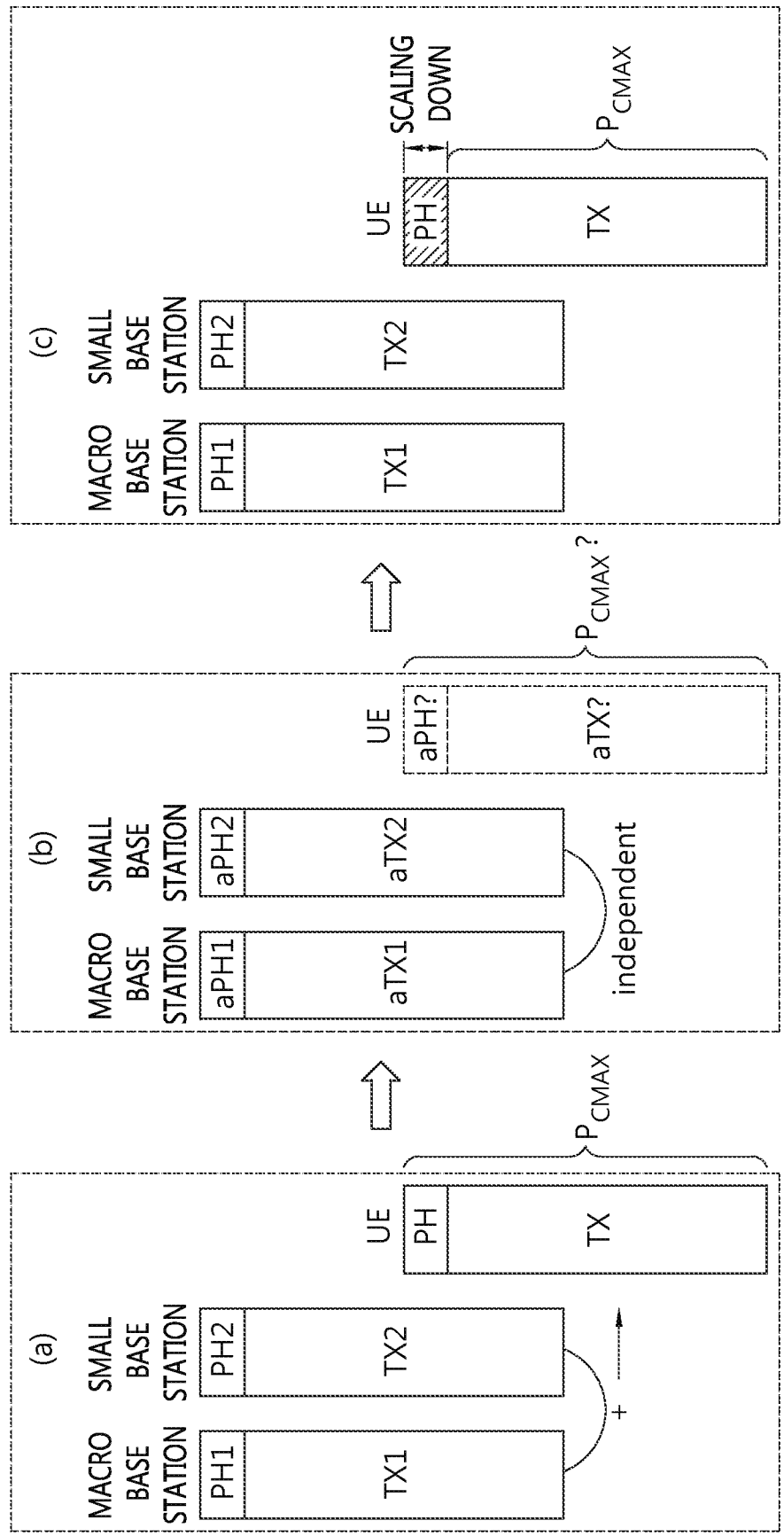
FIG. 4 is a diagram illustrating one example of a scaling-down situation which occurs by two base stations having independent schedules.

FIG. 4 is a diagram illustrating one example of a scaling-down situation which occurs by two base stations having independent schedules.

Referring to FIG. 4, (a) illustrates a case in which the UE performs a power headroom report (PHR) to each base station.

The UE transmits the power headroom report (PHR) to each base station based on a transmission power value (TX1) for the macro base station and a transmission power value (TX2) for the small base station and power headroom (PH1) for the macro base station and power headroom (PH2) information for the small base station.

The PHR includes power headroom (PH) or maximum output power ($P_{CMAX}$) information. Therefore, the base station may verify transmission power value (TX) information.

The UE transmits both the PH1 and the PH2 to the macro base station. Similarly, the UE transmits both the PH1 and the PH2 even to the macro base station. Therefore, the UE has an effect simultaneously transmit "transmission power information of the macro base station" and "transmission power information of the small base station" to the macro base station. Similarly, the UE has an effect simultaneously transmit the "transmission power information of the macro base station" and the "transmission power information of the small base station" to the small base station.

The power headroom PH1 of the macro base station satisfies "PH1=$P_{CMAX}$−TX1" and the power headroom (PH2) of the small base station satisfies "PH2=$P_{CMAX}$-TX2". In the case of UE powerclass 3, the maximum transmission power of the UE is 23 dBm.

The transmission power (TX) of the UE may be the sum of the transmission power (TX1) of the macro base station and the transmission power (TX2) of the small base station. That is, "TX=TX1+TX2".

The power headroom (PH) may be expressed as a difference of the maximum output power ($P_{CMAX}$) of the UE and the transmission power (TX) of the UE. That is, "PH=$P_{CMAX}$-TX".

The macro base station and the small base station may receive all of the PH1 and PH2 values and the TX1 and TX2 values and each base station may determine all of the PH and the TX of the UE.

(b) illustrates a process in which the base station having the scheduler anticipates the transmission power in order to allocate the UL grant (e.g., permitted transmission power and power headroom estimation values) by each scheduler.

Each base station (e.g., the macro base station or the small base station) allocates anticipated transmission power (aTX) which is anticipated to be permitted to the UE based on the received power headroom report. Transmission power anticipated when the UE transmits the transmission power to the macro base station is referred to as aTX1 and transmission power anticipated when the UE transmits the transmission power to the small base station is referred to as aTX2. Power headroom PH (referred to as ("aPH1")) of the UE which is anticipated when the UE transmits the transmission power to the macro base station and power headroom PH (referred to as ("aPH2")) of the UE which is anticipated when the UE transmits the transmission power to the small base station are equal to or smaller than PH.

Since the macro base station and the small base station may not share scheduling information with each other, it is difficult to anticipate accurate aPH and aTX values.

As UE transmission power is allocated, which the macro base station and the small base station individually schedule and individually anticipate without exchanging information with each other, the UE may be difficult to how to actually anticipate the transmission power (TX) and the power headroom (PH) which is permitted to the UE and establish the transmission power (aTX) and the power headroom (PH).

For example, the UE establishes aTX by considering aTX1 and aTX2 and as a result, the PH value. There is a high possibility that aTX1 and aTX2 will be scheduled by a method that may maximally increase the transmission efficiency with respect to each base station. For example, the macro base station may perform scheduling so as to use maximum power which the UE may transmit in order to maximally increase the transmission efficiency of the UE. Accordingly, the UE may allocate transmission power (aTX=aTX1+aTX2) at a level corresponding to the sum of aTX1 and aTX2. When the macro base station and the small base station may exchange the scheduling information with each other within an available time, if any one base station is scheduled to use the maximum transmission power, the other base station performs scheduling by maximally reducing the transmission power to prevent the UE from allocating the transmission power over a power use limit thereof (c) illustrates the case of UL transmission of the UE and a case in which the UE allocates uplink transmissions power of the UE through uplink transmission powers TX1 and TX2 which are permitted in the macro and small base stations.

When the UE allocates the uplink transmission power based on the transmission powers which are permitted in the macro base station and the small base station, the UE may allocate the transmission powers as shown in an equation given below.

$$TX=TX1+TX2 \geq P_{CMAX}$$

$$P_{CMAX}-TX=PH<0 \qquad \text{[Equation 4]}$$

Herein, TX represents actual uplink transmission power of the UE and PH represents the power headroom of the UE. When TX is larger than $P_{CMAX}$ means a case in which the UE allocates transmission power larger than limit power (maximum output power) which may be actually allocated.

When each base station independently performs scheduling, the base station may permit maximum power to the UE so as to maximally increase the transmission efficiency of the UE.

In this case, when both the macro base station and the small base station permit the maximum power to the UE, the UE may allocate transmission power larger than the maximum output power $P_{CMAX}$ which the UE may transmit. Accordingly, the UE may scale down the allocated transmission power.

Meanwhile, when the UE may perform UL transmission to a plurality of cells (e.g., CA situation), the maximum output power ($P_{CMAX}$) considering the plurality of cells is determined as shown in an equation given below.

$$P_{CMAX\_L\_CA} \leq P_{CMAX} \leq P_{CMAX\_H\_CA} \qquad \text{[Equation 5]}$$

Herein, $P_{CMAX\_L\_CA}$ and $P_{CMAX\_H\_CA}$ are defined as an equation given below.

$$P_{CMAX\_L\_CA}=\text{MIN}(10 \log_{10}\Sigma p_{EMAX,c}-\Delta T_C, P_{POWERCLASS}-\text{MAX}(MPR+A-MPR,P-MPR)-\Delta T_C) \qquad \text{[Equation 6]}$$

$$P_{CMAX\_H\_CA}=\text{MIN}(10 \log_{10}\Sigma p_{EMAX,c}, P_{POWERCLASS}) \qquad \text{[Equation 7]}$$

Herein, $p_{EMAX,c}$ is a linear value of $P_{EMAX,c}$ and is given by P-Max with respect to a serving cell c. A value of P-Max($P_{EMAX}$) is a value fixed for each serving cell and is transmitted to the UE by RRC signaling. $\Delta T_{C,c}$ represents a fixed power offset value and is a function of a transmission bandwidth (BW) for a component carrier (alternatively, serving cell) c. $\Delta T_c$ is a highest value among $\Delta T_{C,c}$ values for the serving cell c. $P_{EMAX,c}$ is a value fixedly allocated to the serving cell and transmitted to the UE and is a cell-specific value. $P_{EMAX,c}$ is transmitted from the base station to the UE through the RRC signaling. $P_{EMAX,c}$ corresponds to the maximum power which the UE is permitted to transmit to the corresponding cell.

As one example, $P_{EMAX,c}$ is included in system information block type 1 to be transmitted.

Meanwhile, by considering a case in which scaling down may occur due to two independent schedules which are present in two base stations which are dually connected, the maximum transmission power (that is, the sum of the $P_{EMAX,c}$ values for the respective base stations) of the UE needs to be controlled so as not to be more than the $P_{POWERCLASS}$ value or the $P_{CMAX}$ value of the UE even though reduction of predetermined transmission efficiency is considered.

Hereinafter, a method and an apparatus for controlling the maximum transmission power of the UE according to the present invention will be described.

According to the present invention, the maximum transmission power ($P_{EMAX,C}$) allocated to the UE while dual connectivity includes maximum transmission power ($mP_{EMAX,c}$) for the macro base station and maximum transmission power ($sP_{EMAX,c}$) for the small base station. The $mP_{EMAX,c}$ and the $sP_{EMAX,c}$ are UE dedicated (specific) parameters determined for a specific UE.

Therefore, the $mP_{EMAX,C}$ and the $sP_{EMAX,c}$ have a relationship like an equation given below with respect to the UE which is dually connected.

$$mP_{EMAX,c} + sP_{EMAX,c} \leq P_{CMAX} \qquad \text{[Equation 8]}$$

$$mP_{EMAX,c} + sP_{EMAX,c} \leq P_{POWERCLASS} \qquad \text{[Equation 9]}$$

That is, the sum of the maximum transmission power for the macro base station and the maximum transmission power for the small base station is equal to or smaller than $P_{CMAX}$ and equal to or smaller than $P_{POWERCLASS}$. In particular, since $P_{POWERCLASS}$ is maximum power (e.g., 23 dBm) on a manufacturing specification of the UE, $P_{POWERCLASS}$ is a parameter indicating the capability of the UE.

As one example, the $mP_{EMAX,c}$ and $sP_{EMAX,c}$ may be transmitted from the base station to the UE through RRC dedicated signaling (e.g., RRC message).

As another example, the $mP_{EMAX,c}$ and $sP_{EMAX,c}$ may be transmitted to the UE from one base station (e.g., the macro base station or the small base station) all at once.

As yet another example, when an RRC layer is present in each base station, the $mP_{EMAX,c}$ may be transmitted from the macro base station to the UE and the $sP_{EMAX,c}$ may be transmitted from the small base station to the UE.

When the UE may perform transmission/reception simultaneously through three or more base stations, a relationship of an equation given below may be established.

$$\Sigma kP_{EMAX,c} \leq P_{CMAX} \qquad \text{[Equation 10]}$$

$$\Sigma kP_{EMAX,c} \leq P_{POWERCLASS} \qquad \text{[Equation 11]}$$

Herein, $kP_{EMAX,c}$ is a value transmitted to the UE through the RRC dedicated signaling for each serving cell of the UE or for each base station (however, 1≤k≤n and n represents the number of serving base stations).

When the UE performs transmission/reception simultaneously through three or more cells, the $mP_{EMAX}$ and $sP_{EMAX}$ values may be determined based on two groups and transferred to the UE through the RRC dedicated signaling for each serving cell or base station. For example, the $mP_{EMAX}$ may be transferred to the serving cells that belong to the master cell group corresponding to the macro base station and the $sP_{EMAX}$ may be transferred to the serving cells that belong to the secondary cell group corresponding to the small base station. As another example, the $P_{EMAX,c}$ value determined based on the $mP_{EMAX}$ may be transferred for each of the cells that belong to the master cell group and the $P_{EMAX,c}$ value based on the $sP_{EMAX}$ may be determined and transferred for each of the cells that belong to the secondary cell group. That is, the corresponding $P_{EMAX,c}$ values for the cells in one cell group may be different from each other.

The existing PEMAX value is a value set for each specific cell in the base station and is determined as the same value in one cell, while the mPEMAX and sPEMAX are dedicatively (specifically) set values for each specific UE and transmitted to the UE through the RRC dedicated signaling. The mPEMAX and sPEMAX are also referred to as dPEMAX(dedicated PEMAX) allocated to the specific UE.

Hereinafter, PCMAX establishment for the UE which is dually connected will be described.

As one example, the UE which is dually connected may establish $P_{CMAX}$ as shown in an equation given below.

$$P_{CMAX\_L\_DU} \leq P_{CMAX} \leq P_{CMAX\_H\_DU} \qquad \text{[Equation 12]}$$

Herein, $P_{CMAX\_L\_DU}$ and $P_{CMAX\_H\_DU}$ are defined as shown below.

$$P_{CMAX\_L\_DU} = \text{MIN}(10 \log_{10} \Sigma kp_{EMAX,c} - \Delta T_C, P_{POWERCLASS} - \text{MAX}(MPR + A - MPR, P - MPR) - \Delta T_C) \qquad \text{[Equation 13]}$$

$$P_{CMAX\_H\_DU} = \text{MIN}(10 \log_{10} \Sigma kp_{EMAX,c}, P_{POWERCLASS}) \qquad \text{[Equation 14]}$$

Herein, $kp_{EMAX,c}$ is a linear value of $kP_{EMAX,c}$. dP–Max is a value allocated to the UE and a value transmitted to the UE through the RRC dedicated signaling for each cell.

FIGS. 5 to 8 are flowcharts illustrating one example of a method for establishing UE dedicated maximum transmission power according to the present invention. The method is a method for transmitting $mP_{EMAX,c}$ and $sP_{EMAX,c}$ from the base station to the UE.

$P_{CMAX\_L\_DU}$ corresponds to a lowerlimit value of a $P_{CMAX}$ establishment range while dual connectivity.

$P_{CMAX\_H\_DU}$ corresponds to an upperlimit value of the $P_{CMAX}$ establishment range while dual connectivity.

Figure 5:
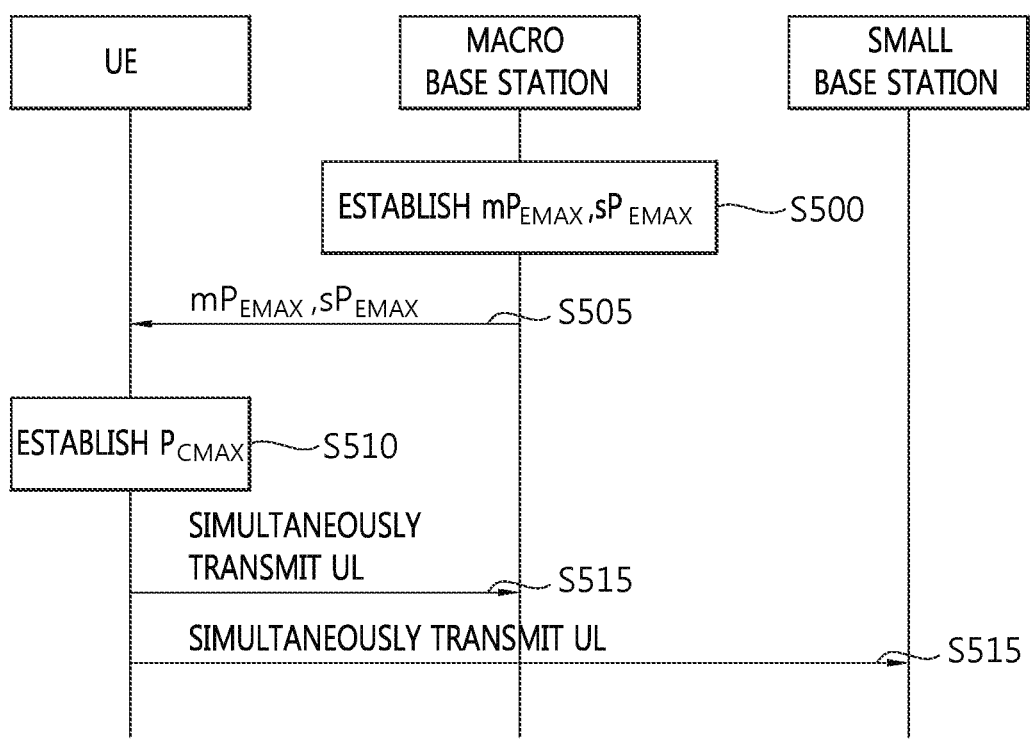
FIGS. 5 to 8 are flowcharts illustrating one example of a method for configuring UE dedicated maximum transmission power according to the present invention.

FIG. 5 is an example of signaling $mP_{EMAX}$ and $sP_{EMAX}$ establishment in the macro base station. The macro base station may previously know capability information of the UE and if not, the macro base station may receive the capability information from the UE.

Referring to FIG. 5, the macro base station establishes $mP_{EMAX}$ and $sP_{EMAX}$ through a configuration of the small base station (S500) and the sum of $mP_{EMAX}$ and $sP_{EMAX}$ is established so as not to be larger than $P_{POWERCLASS}$.

The macro base station transfers to the UE the established $mP_{EMAX}$ and $sP_{EMAX}$ (S505).

In this case, since information on the $mP_{EMAX}$ and $sP_{EMAX}$ is a UE dedicated (specific) establishment value, the information the $mP_{EMAX}$ and $sP_{EMAX}$ is transferred from the macro base station to the UE through the dedicated signaling (e.g., RRC signaling or RRC connection reconfiguration message) between the base station and the UE. The RRC connection reconfiguration message corresponds to one example and is included in other RRC message, and as a result, $mP_{EMAX}$ and $sP_{EMAX}$ may be transmitted. As one example, the information on the $mP_{EMAX}$ and $sP_{EMAX}$ may be configured by the unit of the cell group. As another example, the information on the $mP_{EMAX}$ and $sP_{EMAX}$ may be configured by the unit of the cell.

The UE establishes $P_{CMAX}$ based on the received $mP_{EMAX}$ and $sP_{EMAX}$ values (S510).

The UE performs simultaneous UL transmission to the macro base station or the small base station based on the received UL grant (S515).

Figure 6:
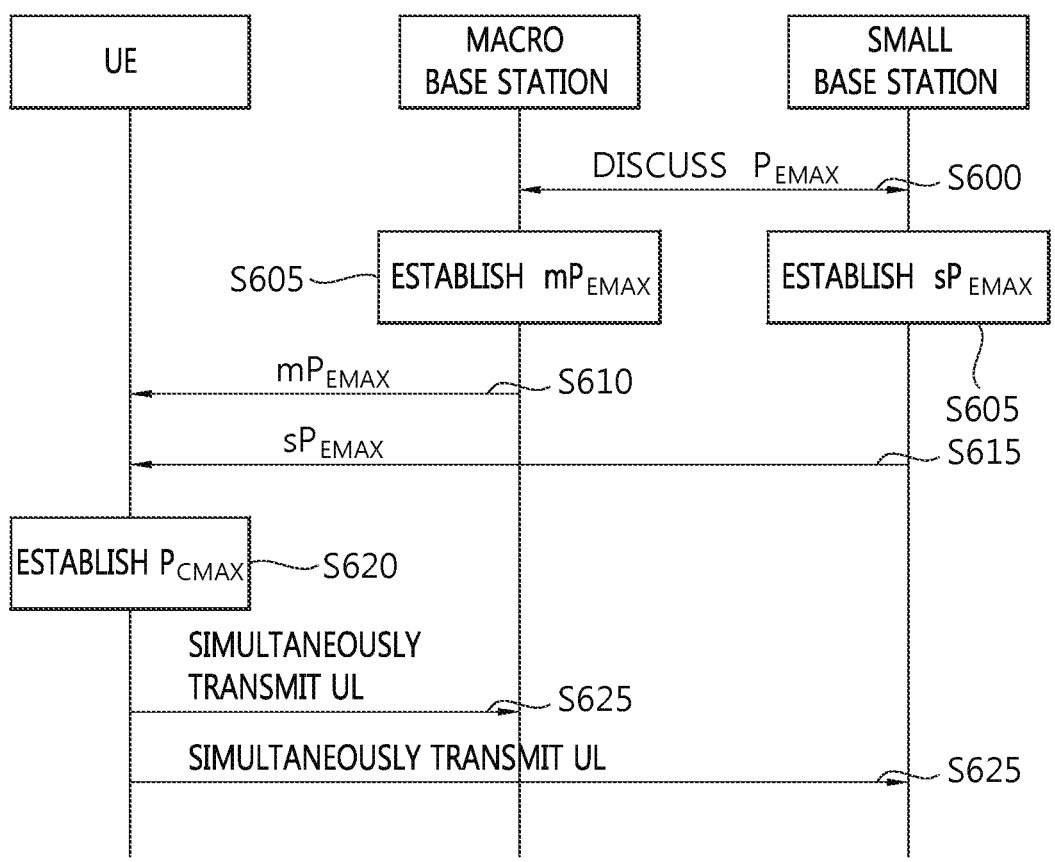

FIG. 6 is an example of signaling $mP_{EMAX}$ and $sP_{EMAX}$ establishment in the macro base station and the small base station.

Referring to FIG. 6, when dual connectivity is requested to the specific UE, the macro base station and the small base station discuss $mP_{EMAX}$ and $sP_{EMAX}$ to be established to the UE (S600). In this case, each base station discusses the sum of $MP_{EMAX}$ and $sP_{EMAX}$ not to larger than $P_{POWERCLASS}$.

The macro base station establishes $mP_{EMAX}$ and the small base station establishes $sP_{EMAX}$ (S605). Each base station establishes the sum of $mP_{EMAX}$ and $sP_{EMAX}$ not to larger than $P_{POWERCLASS}$.

The established $mP_{EMAX}$ value is transmitted from the macro base station (S610) and the $sP_{EMAX}$ value is transmitted from the small base station to the UE (S615). As one example, the information on the $mP_{EMAX}$ and $sP_{EMAX}$ may be configured by the unit of the cell group. As another example, the information on the $mP_{EMAX}$ and $sP_{EMAX}$ may be configured by the unit of the cell.

The UE establishes $P_{CMAX}$ based on the $mP_{EMAX}$ and $sP_{EMAX}$ values (S620).

The UE performs simultaneous UL transmission to the macro base station or the small base station based on the received UL grant (S625).

Figure 7:
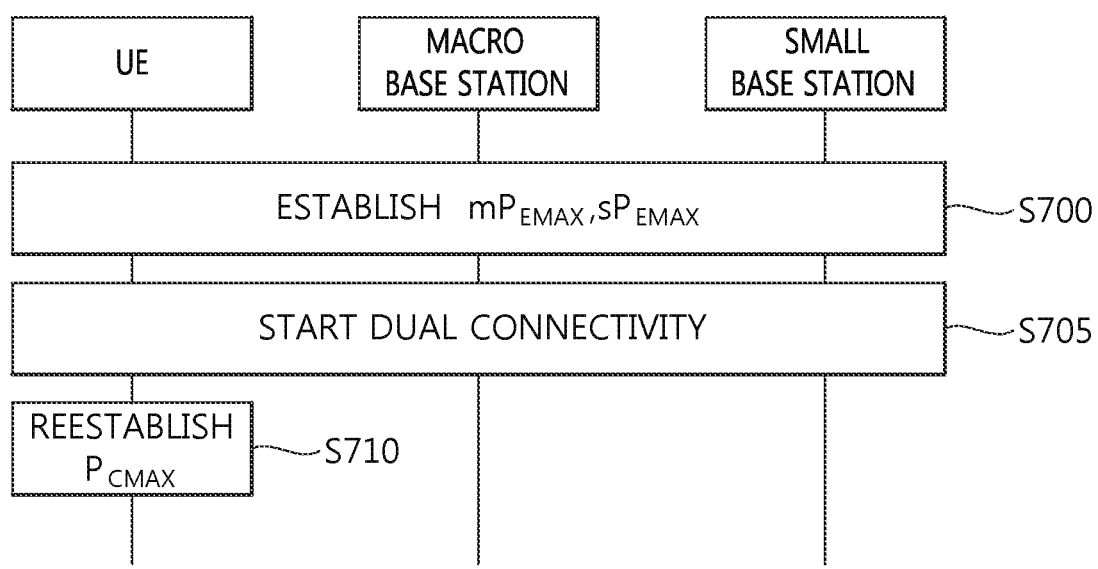
Figure 8:
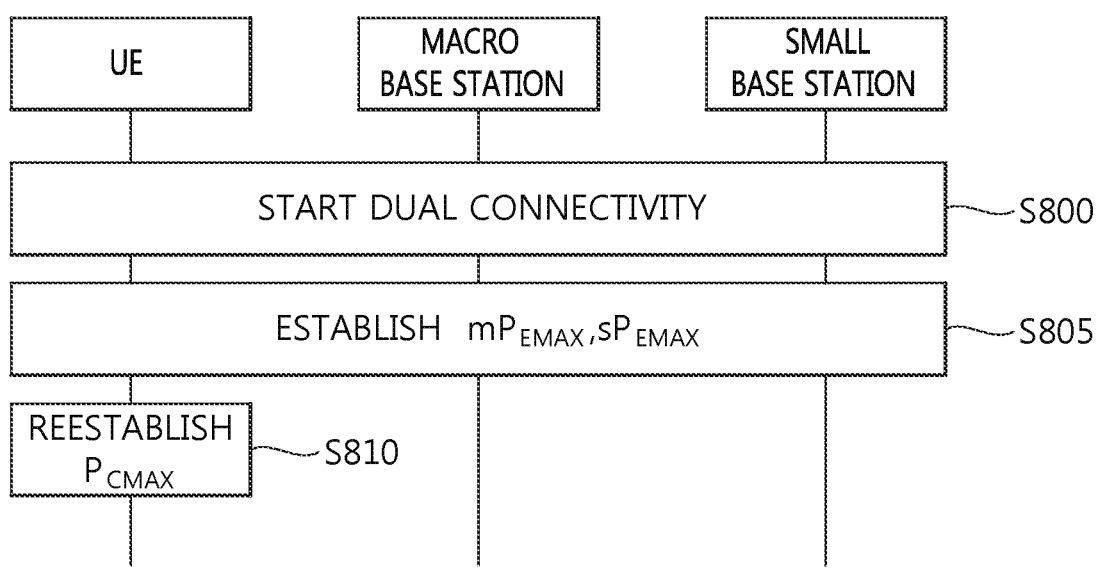

FIGS. 7 and 8 are examples of establishing $mP_{EMAX}$ and $sP_{EMAX}$ values for each UE for dual connectivity.

FIG. 7 illustrates one example of establishing $mP_{EMAX}$ and $sP_{EMAX}$ before application of dual connectivity.

Referring to FIG. 7, $mP_{EMAX}$ and $sP_{EMAX}$ are established in the respective base stations and transmitted to the UE through the dedicated signaling. Before starting the dual connectivity, the UE receives the $mP_{EMAX}$ and $sP_{EMAX}$ from the base station, but the UE calculates $P_{CMAX}$ based on the existing $P_{EMAX}$ (e.g., IE P-Max). The $mP_{EMAX}$ and $sP_{EMAX}$ values received by the UE as the UE dedicated (specific) values considering the dual connectivity need not be used before the dual connectivity.

In other words, the UE uses the dedicated (specific) maximum transmission power $mP_{EMAX}$ and $sP_{EMAX}$ values which the UE receive from the base station through the dedicated signaling at the time when the dual connectivity starts and in this case, the UE calculates the maximum output power $P_{CMAX}$ by using the dedicated (specific) maximum transmission power $mP_{EMAX}$ and $sP_{EMAX}$ values.

The UE starts the dual connectivity to the macro base station and the small base station (S705).

As one example, the macro base station may transfer to the UE "the dual connectivity to the small base station starts" or "the dual connectivity to the small base station is available". In this case, the UE may access the small base station while keeping the access to the macro base station.

The UE may newly calculate (alternatively, update) $P_{CMAX}$ in the dual connectivity by using $mP_{EMAX}$ and $sP_{EMAX}$ received in step S700 (S710).

In this case, since $mP_{EMAX}$ and $sP_{EMAX}$ need to be distinguished from the $P_{EMAX}$ value before the dual connectivity to the UE starts, the UE does not substitute the existing $P_{EMAX}$ with $mP_{EMAX}$ and $sP_{EMAX}$ and manages the existing $P_{EMAX}$ while keeping the existing $P_{EMAX}$ as it is.

FIG. 8 illustrates one example of establishing $mP_{EMAX}$ and $sP_{EMAX}$ after dual is connectivity starts.

Referring to FIG. 8, the UE starts the dual connectivity (S800).

The macro base station may transfer to the UE "the dual connectivity to the small base station starts" or "the dual connectivity to the small base station is available". In this case, the UE may access the small base station while keeping the access to the macro base station.

When the macro base station or the small base station notifies the dual connectivity to the UE, the UE may determine a situation in which the dual connectivity starts.

The macro base station or the small base station establishes the When the $mP_{EMAX}$ and $sP_{EMAX}$ values to the UE (S805). As one example, the information on the $mP_{EMAX}$ and $sP_{EMAX}$ may be configured by the unit of the cell group. As another example, the information on the $mP_{EMAX}$ and $sP_{EMAX}$ may be configured by the unit of the cell.

The UE reestablishes new $P_{CMAX}$ through $mP_{EMAX}$ and $sP_{EMAX}$ used in the dual connectivity (S810). The $mP_{EMAX}$ and $sP_{EMAX}$ are values established and transmitted after the dual connectivity.

The UE may substitute the value corresponding to the existing $P_{EMAX}$ with the $mP_{EMAX}$ and $sP_{EMAX}$. For example, a method of changing p-Max values corresponding to $P_{EMAX}$, C to p-Max values corresponding to $mP_{EMAX}$ and $sP_{EMAX}$ before the dual connectivity starts may be applied to the UE.

The following table illustrates one example of an information element (IE) in which $mP_{EMAX}$ and $sP_{EMAX}$ are established. The information element is an uplink power control dedicated IE.

TABLE 1

UplinkPowerControlDedicated-v12xx ::= SEQUENCE
{
m-p-Max-r12P-Max-r12
s-p-Max-r12P-Max-r12
}

Herein, "m-p-Max-r12" represents the $mP_{EMAX}$ value applied to the UE and "s-p-Max-r12" represents the $sP_{EMAX}$ value applied to the UE.

Figure 9:
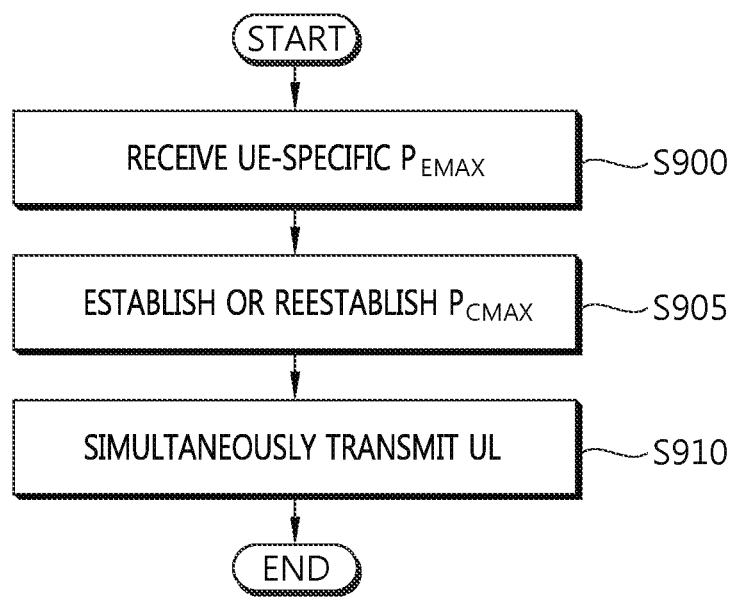
FIG. 9 is a flowchart illustrating an operation of UE that configures UE dedicated maximum transmission power according to the present invention.

FIG. 9 is a flowchart illustrating an operation of UE that establishes UE dedicated maximum transmission power according to the present invention.

Referring to FIG. 9, the UE which is dually connected receives the UE dedicated (specific) maximum transmission power values ($mP_{EMAX}$ and $sP_{EMAX}$) established in the macro base station or the small base station through the dedicated signaling (e.g., RRC signaling) (S900). The $mP_{EMAX}$ and the $sP_{EMAX}$ are parameters so that the sum of the $mP_{EMAX}$ and the $sP_{EMAX}$ is not larger than $P_{POWERCLASS}$ (alternatively, $P_{CMAX}$) and parameters determined for each cell and having different values in respective UEs.

As one example, the UE may receive an indication of "dual connectivity ON" and receive the $mP_{EMAX}$ and $sP_{EMAX}$ from the base station while approach through the primary serving cell.

The UE establishes (alternatively, reestablishes) the maximum output power PCMAX based on the received $mP_{EMAX}$ and $sP_{EMAX}$ values (S905).

The UE performs simultaneous UL transmission to the macro base station or the small base station based on the received UL grant (S910).

On the contrary, when the UE is not dually connected, the same value as $P_{CMAX}$ is established as an initial value (a default value) of the $mP_{EMAX}$ or $sP_{EMAX}$.

Figure 10:
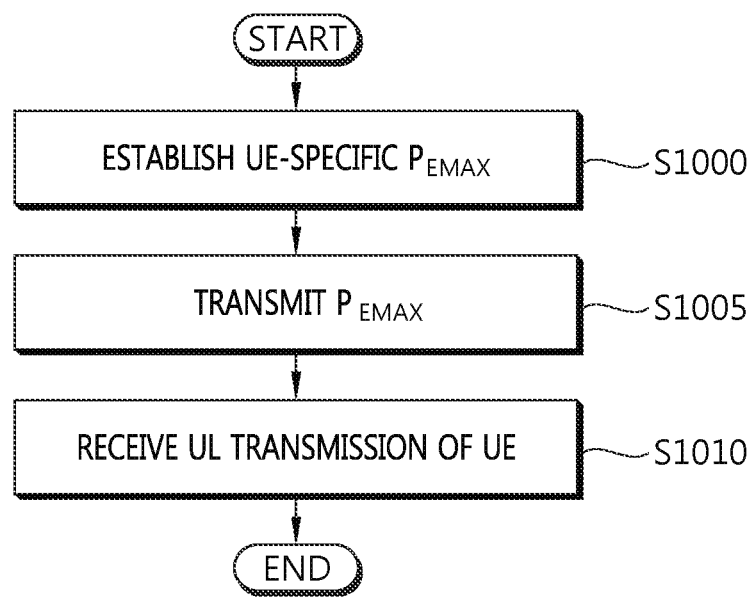
FIG. 10 is a flowchart illustrating one example of an operation of UE which reports power headroom according to the present invention.

FIG. 10 is a flowchart illustrating an operation of a base station that establishes UE dedicated maximum transmission power according to the present invention. The base station may previously know capability information of the UE and if not, the base station may receive the capability information from the UE.

Referring to FIG. 10, the base station establishes UE specific maximum transmission power values ($mP_{EMAX}$ and $sP_{EMAX}$) (S1000).

As one example, the macro base station establishes $mP_{EMAX}$ and $sP_{EMAX}$ through a configuration of the small base station. As another example, the small base station establishes $mP_{EMAX}$ and $sP_{EMAX}$ through a configuration of the macro base station. As yet another example, the base station establishes the sum of $mP_{EMAX}$ and $sP_{EMAX}$ not to larger than $P_{POWERCLASS}$ (alternatively, $P_{CMAX}$).

The macro base station transfers to the UE the established $mP_{EMAX}$ and $sP_{EMAX}$ (S1005).

In this case, since information on the $mP_{EMAX}$ and $sP_{EMAX}$ is a UE specific parameter, the information the $mP_{EMAX}$ and $sP_{EMAX}$ may be transferred through the dedicated signaling (e.g., RRC signaling or RRC connection reconfiguration message) between the base station and the UE.

According to $P_{CMAX}$ which the UE establishes based on $mP_{EMAX}$ and $sP_{EMAX}$, the base station receives UL transmission of the UE (S1010).

Figure 11:
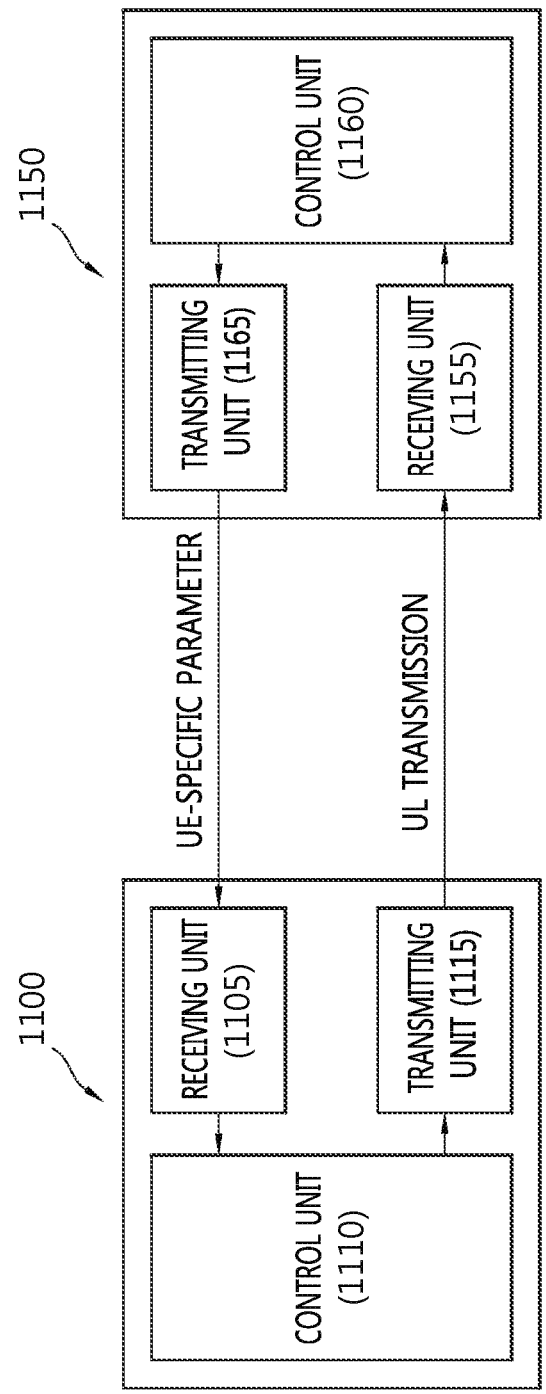
FIG. 11 is a block diagram illustrating an apparatus for configuring maximum transmission power according to an exemplary embodiment of the present invention.

FIG. 11 is a block diagram illustrating an apparatus for establishing maximum transmission power according to the present invention.

Referring to FIG. 11, UE 1100 includes a receiving unit 1105, a control unit 1110, and a transmitting unit 1115.

The receiving unit 1105 receives the UE dedicated (specific) maximum transmission power values ($mP_{EMAX}$ and $sP_{EMAX}$) established in the macro base station or the small base station through the dedicated signaling (e.g., RRC signaling). The $mP_{EMAX}$ and the $sP_{EMAX}$ are parameters so that the sum of the $mP_{EMAX}$ and the $sP_{EMAX}$ is not larger than $P_{POWEACLASS}$ (alternatively, $P_{CMAX}$) and parameters determined for each cell and having different values in respective UEs.

As one example, the receiving unit 1105 may receive an indication of "dual connectivity ON" and receive the $mP_{EMAX}$ and $sP_{EMAX}$ from the base station 1150.

The control unit 1110 establishes or reestablishes) the maximum output power ($P_{CMAX}$) based on the received $mP_{EMAX}$ and $sP_{EMAX}$ values.

The transmitting unit 1115 performs simultaneous UL transmission to the macro base station or the small base station based on the received UL grant.

On the contrary, when the UE 1100 is not dually connected, the control unit 1110 establishes the same value as $P_{CMAX}$ is established as an initial value (a default value) of the $mP_{EMAX}$ or $sP_{EMAX}$.

The base station 1150 includes a receiving unit 1155, a control unit 1160, and a transmitting unit 1165.

The control unit 1160 establishes UE specific maximum transmission power values ($mP_{EMAX}$ and $sP_{EMAX}$).

As one example, the control unit 1160 establishes the sum of $mP_{EMAX}$ and $sP_{EMAX}$ not to larger than $P_{POWERCLASS}$ (alternatively, $P_{CMAX}$).

The transmitting unit 1165 transfers the established $mP_{EMAX}$ and $sP_{EMAX}$ to the UE 1100. In this case, since information on the $mP_{EMAX}$ and $sP_{EMAX}$ is a UE specific parameter, the information the $mP_{EMAX}$ and $sP_{EMAX}$ may be transferred through the dedicated signaling (e.g., RRC signaling or RRC connection reconfiguration message) between the base station and the UE.

The receiving unit 1155 receives UL transmission of the UE according to $P_{CMAX}$ which the UE 1100 establishes based on the $mP_{EMAX}$ and $sP_{EMAX}$ values.

Figure 12:
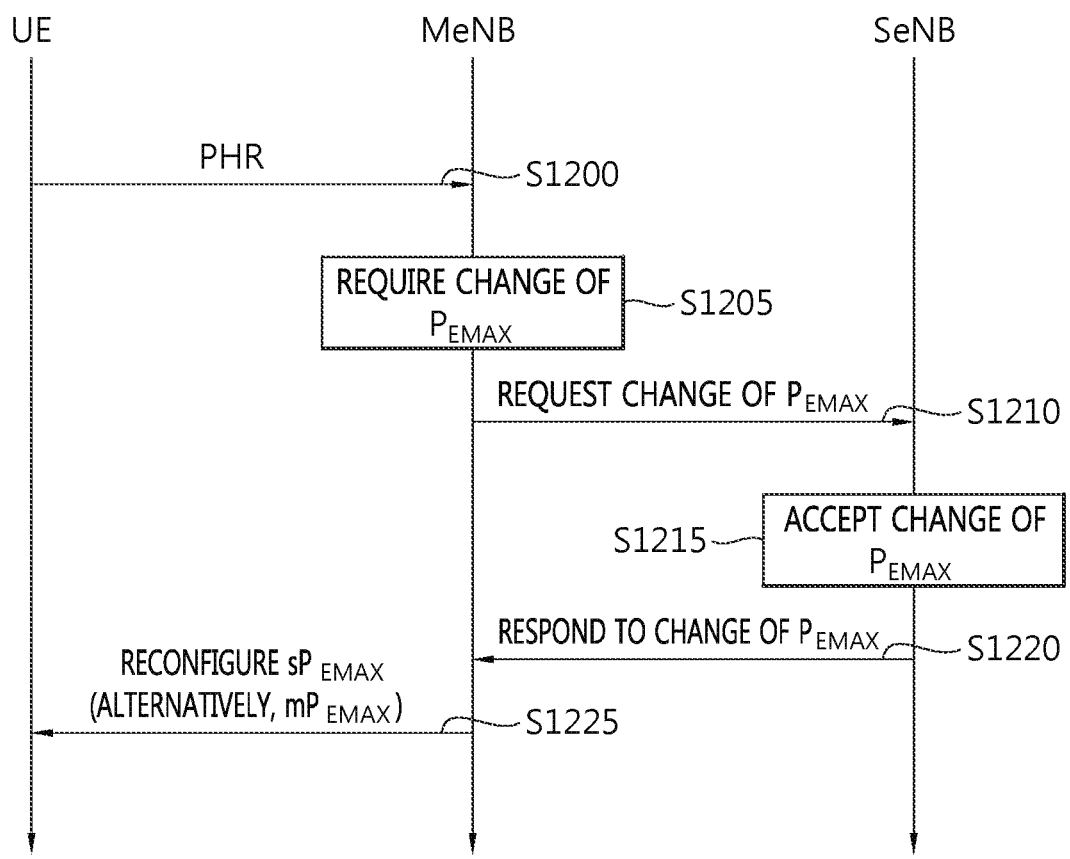
FIG. 12 is a flowchart illustrating a process in which a change configuration is performed when changing $mP_{EMAX}$ and $sP_{EMAX}$ values is required (alternatively, the values are changed) according to one example of the present invention.

FIG. 12 is a flowchart illustrating a process in which a change configuration is performed when changing $mP_{EMAX}$ and $sP_{EMAX}$ values is required (alternatively, the values are changed) according to one example of the present invention. Embodiments described below may be extensively applied when the $mP_{EMAX}$ and $sP_{EMAX}$ values are changed in the case where the $mP_{EMAX}$ and $sP_{EMAX}$ values are established according to the embodiment disclosed in the specification and in the case where the $mP_{EMAX}$ and $sP_{EMAX}$ values are established by other methods.

Referring to FIG. 12 the UE calculates power headroom associated with a secondary base station and transmits a report of the power headroom (PHR) to a master base station (MeNB) (S1200). The control unit 1110 of the UE 1100 may calculate the power headroom. Meanwhile, the transmitting unit 1115 of the UE 1100 may transmit the PHR. Herein, the PHR may include at least one information of $P_{CMAX,cg}$ or $PH_{cg}$, and a virtual indicator of a counter base station (a counter base station for the master base station is the secondary base station and a counter base station for the secondary base station is the master base station) measured at the time of the power headroom report (PHR).

$P_{CMAX,cg}$ represents values of $P_{CMAX}$ for all serving cells that belong to an MCG or SCG measured at the time of the PHR. That is, $P_{CMAX,cg}$ is not $P_{CMAX,c}$ for each of the serving cells that belong to the MCG or SCG and means one value for the entirety of the corresponding serving cell.

$PH_{cg}$ means power headroom values for all serving cells that belong to the MCG or SCG. That is, $PH_{cg}$ is not a power headroom value for each of the serving cells that belong to the SCG and means one value for the entirety of the serving cell.

Two types of information of $P_{CMAX,cg}$ and $PH_{cg}$ values may be present according to PUCCH transmission in the MCG or SCG being included. A type considering the PUCCH transmission will be referred to as type 1 and a type not considering the PUCCH transmission will be referred to as type 2. That is, $P_{CMAX,cg}$ includes $P_{CMAX,cg}$ of type 1 and $P_{CMAX,cg}$ of type 2 and $PH_{cg}$ also includes $PH_{cg}$ of type 1 and $PH_{cg}$ of type 2. As such, the information included in the PHR may include not one value but two values such as type 1 and type 2 in order to send the information included in the PHR by considering each type.

The virtual indicator indicates whether transmission in the MCG is performed at the time of the power headroom report. As one example, the virtual indicator as a 1 bit may indicate a situation in which transmission is not performed in all serving cells that belong to the MCG or SCG. When transmission is not performed in all serving cells that belong to the MCG or SCG, the virtual indicator may be set to 1 and when transmission is performed in at least one serving cell among the serving cells that belong to the MCG or SCG, the virtual indicator may be set to 0. As another example, the virtual indicator as a bitmap may directly indicate a serving cell in which transmission is not performed among the serving cells that belong to the MCG or SCG. As another example, the virtual indicator may indicate the number of serving cells in which transmission is not performed among the serving cells that belong to the MCG or SCG.

As yet another example of the PHR transmission, power information of all is activated serving cells of the secondary base station may be transferred to the master base station after the control unit 1110 of the UE 1100 calculates the power headroom based on virtual transmission. Calculating the power headroom based on the virtual transmission includes calculating the power headroom by assuming that transmission to the serving cell of the secondary base station is not performed at the time when the PHR is transmitted. That is, power information of all activated serving cells of the secondary base station at the corresponding time means that the UE calculates the power headroom by determining that transmission is not performed regardless of actual transmission being performed.

The UE calculates the power headroom based on a reference establishment at the time of calculating the power headroom based on the virtual transmission. As one embodiment of calculating PUSCH reference transmission power, using an equation given below is included.

$$P_{PUSCH,c}(i) = \min\{P_{CMAX,c}(i), P_{O\_PUSCH,c}(1) + \alpha_c(1) \cdot PL_c + f_c(i)\}[dBm] \quad \text{[Equation 15]}$$

In Equation 15, $\overline{P}_{CMAX,c}(i)$ is calculated by assuming MPR=0 dB, A-MPR=0 dB, P-MPR=0 dB, and TC=0 dB and calculation is performed by assuming that there is no bandwidth of the PUSCH resource assignment and there is no modulation and coding scheme (MCS) level. That is, 10 $\log_{10}(M_{PUSCH,c}(i))=0$ and $\Delta_{TF,c}(j)=0$ are meant. In Equation 15, $P_{O\_PUSCH,c}(i)$ is a value which the UE is signaled with and when PUSCH transmission is dynamically allocated, j=1 is established. $\alpha_c(j)$ means that when as a scaling-down factor of a path loss value ($PL_{,C}$), j=1, the corresponding value becomes 1, and as a result, the path loss value is not scaled down. $f_c(i)$ is a value applied as an accumulation or non-accumulation value by a TPC command value included in a DCI format.

As another embodiment of calculating PUSCH reference transmission power, using an equation given below is included.

$$P_{PUSCH,c}(i) = \min\{P_{CMAX,c}(i), P_{O\_PUSCH,c}(1) + \alpha_c(1) \cdot PL_c\}[dBm] \quad \text{[Equation 16]}$$

In Equation 16, the value of $f_c(i)$ is established and calculated as 0. Through Equation 16, a pure path loss value which is not influenced by the TPC command may be known. That is, Equation 16 provides a more accurate value in order to observe a progress of the path loss value in each serving cell of the secondary base station.

Further, as one embodiment of calculating PUCCH transmission power, using an equation given below is included.

$$P_{PUCCH}(i) = \min\{P_{CMAX,c}(i), P_{O\_PUCCH} + PL_c + g(i)\} \quad \text{[Equation 17]}$$

In Equation 17, $\overline{P}_{CMAX,c}(i)$ is calculated by assuming MPR=0 dB, A-MPR=0 dB, P-MPR=0 dB, and TC=0 dB and calculation is performed by assuming that there is no bandwidth of the PUSCH resource assignment and there is no modulation and coding scheme (MCS) level. That is, in Equation 17, the PUCCH transmission power is calculated by assuming $h(n_{CQI}, n_{HARQ}, n_{SR}) = 0$, $\Delta_{F\_PUCCH}(F) = 0$, and $\Delta_{TxD}(F') = 0$. $h(n_{CQI}, n_{HARQ}, n_{SR})$ represents a value associated with information bit numbers of CQI, HARQ, and SR. $\Delta_{F\_PUCCH}(F)$ represents a value associated with determination of transmission power depending on a PUCCH format. $\Delta_{TxD}(F')$ represents a value associated with determination of transmission power used when transmit diversity is acquired through two antennas.

As another embodiment of calculating PUCCH transmission power, using an equation given below is included.

$$P_{PUCCH}(i) = \min(P_{CMAX,c}(i), P_{O\_PUCCH} + PL_c) \quad \text{[Equation 18]}$$

Equation 18 is an equation of calculating the PUCCH transmission power by assuming g(i)=0. Through Equation 18, the pure path loss value which is not influenced by the TPC command may be known. That is, Equation 18 provides a more accurate value in order to observe the progress of the path loss value in each serving cell of the secondary base station.

The master base station that receives the PHR determines whether the change of $P_{EMAX,cg}$ (alternatively, $sP_{EMAX}$ or $mP_{EMAX}$) of the UE is required (S1205) and transmits a change request of $P_{EMAX}$ to the secondary base station (SeNB) (S1210).

The change request may indicate that increasing or decreasing the value of $P_{EMAX,cg}$ of the master base station is required. The increase or decrease of the $P_{EMAX,cg}$ value may be expressed as the $P_{EMAX,cg}$ value as itself and as a change amount or an increase is amount for a current value. Alternatively, the change request may indicate that increasing or decreasing the $P_{EMAX,cg}$ value of the secondary base station is required. Herein, the increase or decrease of the $P_{EMAX,cg}$ value may be expressed as the $P_{EMAX,cg}$ value as itself and as the change amount or increase amount for a current value.

The secondary base station that receives the change request may accept the change of the $P_{EMAX,cg}$ value (S1215). In addition, when the secondary base station accepts the change of the $P_{EMAX,cg}$ value, the secondary base station transmits a changer response of $P_{EMAX}$ to the master base station (S1220). Herein, the change response indicates the change of $P_{EMAX,cg}$ of the master base station or the secondary base station. In this case, although not illustrated, the embodiment may include a method in which the change response is omitted. A meaning that the change response is omitted includes a meaning that the secondary base station unconditionally accepts the request from the master base station. The upper layer signaling is performed by the transmitting unit 1165 of the base station 1150 and the UE's receiving the upper layer signaling is performed by the receiving unit 1105 of the UE 1100.

Meanwhile, the control unit 1110 of the UE 1100 may establish or reestablish the maximum output power ($P_{CMAX}$) configured in the UE based on the upper layer signaling indicating the change of $P_{EMAX,cg}$.

The master base station reconfigures the change of $P_{EMAX,cg}$ to the UE (S1225). For example, reconfiguring the change of $P_{EMAX,cg}$ in the UE includes a case in is which the master base station transmits the upper layer signaling indicating the change of $P_{EMAX,cg}$ to the UE.

Figure 13:
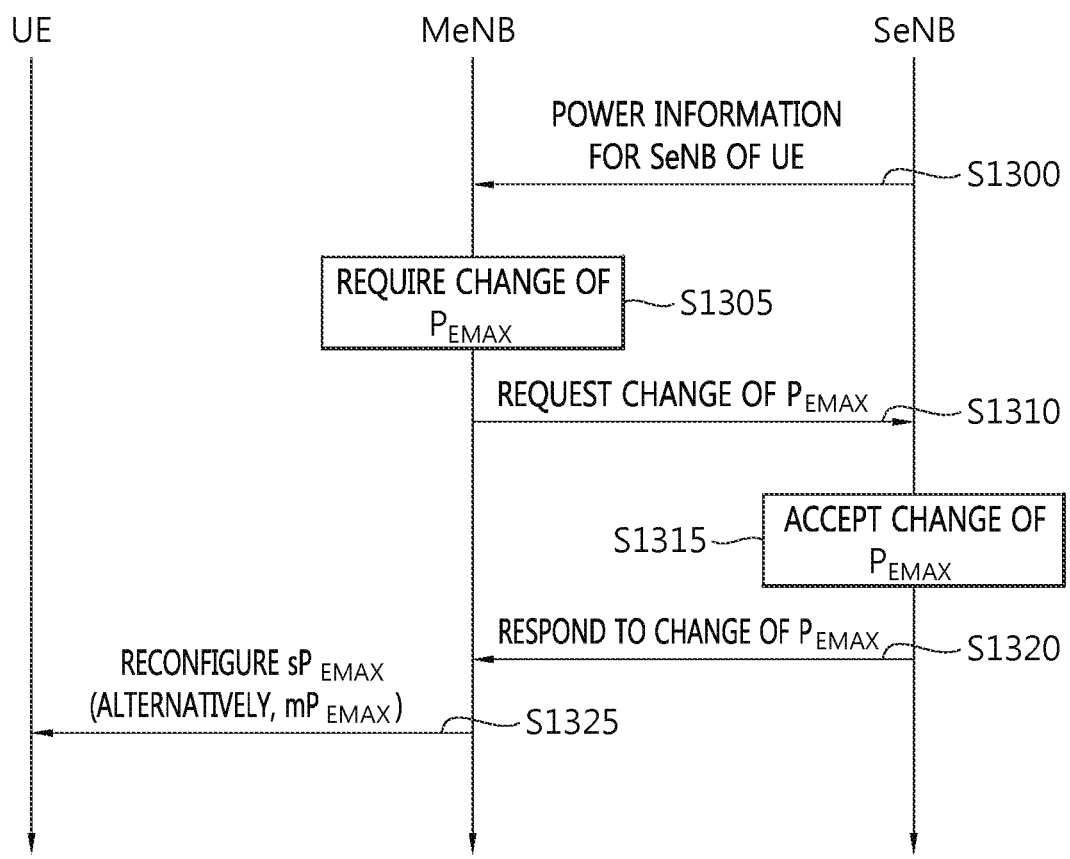
FIG. 13 is a flowchart illustrating a process in which a change configuration is performed when changing $mP_{EMAX}$ and $sP_{EMAX}$ values is required (alternatively, the values are changed) according to another example of the present invention.

FIG. 13 is a flowchart illustrating a process in which a change establishment is performed when changing $mP_{EMAX}$ and $sP_{EMAX}$ values is required (alternatively, the values are changed) according to another example of the present invention.

Referring to FIG. 13, the secondary base station calculates power information for the secondary base station of UE and transmits a report regarding the power information to the master base station (S1300). The power information may be calculated by the control unit 1110 of the UE 1100. Meanwhile, the power information may be reported by the transmitting unit 1115 of the UE 1100.

Herein, the power information for the secondary base station of the UE may include at least one information of $P_{EMAX,cg}$ or $PH_{cg}$ of the secondary base station and the virtual indicator. Further, the power information may include path loss information for each cell of the master base station or information associated with $f_c(i)$ and $g(i)$ generated by accumulation or non-accumulation by the TPC command. Thereafter, steps S1305 to 1325 may be performed similarly to steps S1205 to S1225 of FIG. 12. Herein, the upper layer signaling is performed by the transmitting unit 1165 of the base station 1150 and the UE's receiving the upper layer signaling is performed by the receiving unit 1105 of the UE 1100. Meanwhile, the control unit 1110 of the UE 1100 may establish or reestablish the maximum output power ($P_{CMAX}$) configured in the UE based on the upper layer signaling indicating the change of $P_{EMAX,cg}$.

Figure 14:
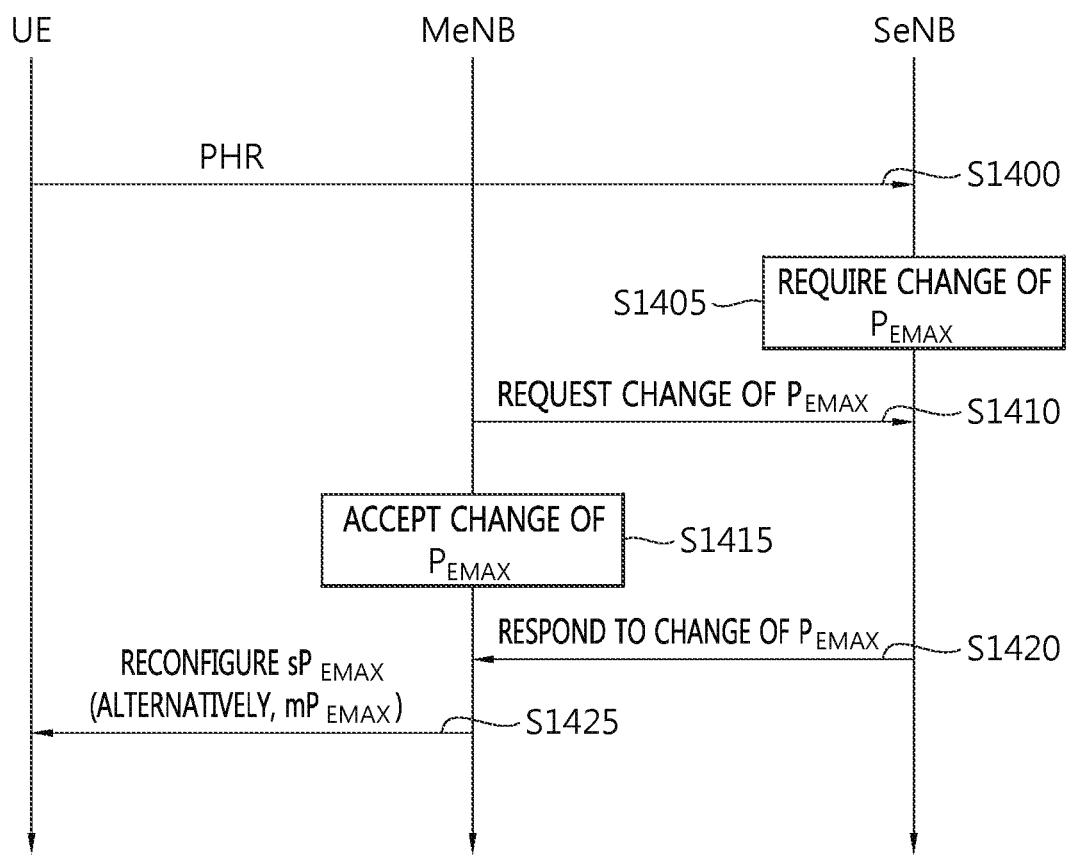
FIG. 14 is a flowchart illustrating a process in which a change configuration is performed when changing $mP_{EMAX}$ and $sP_{EMAX}$ values is required (alternatively, the values are changed) according to yet another example of the present invention.

FIG. 14 is a flowchart illustrating a process in which a change establishment is performed when changing $mP_{EMAX}$ and $sP_{EMAX}$ values is required (alternatively, the values are changed) according to yet another example of the present invention. Embodiments described below may be extensively applied when the $mP_{EMAX}$ and $sP_{EMAX}$ values are changed in the case where the $mP_{EMAX}$ and $sP_{EMAX}$ values are established according to the embodiment disclosed in the specification and in the case where the $mP_{EMAX}$ and $sP_{EMAX}$ values are established by other methods.

Referring to FIG. 14 the UE calculates power headroom associated with the master base station and transmits a report of the power headroom (PHR) to the secondary base station (SeNB) (S1400). The power headroom may be performed by the control unit 1110 of the UE 1100. Meanwhile, the transmitting unit 1115 of the UE 1100 may transmit the PHR. Herein, the PHR may include at least one information of $P_{CMAX,cg}$ or $PH_{cg}$, and a virtual indicator of a counter base station (a counter base station for the master base station is the secondary base station and a counter base station for the secondary base station is the master base station) measured at the time of the power headroom report (PHR).

$P_{CMAX,cg}$ represents values of $P_{CMAX}$ for all serving cells that belong to an MCG or SCG measured at the time of the PHR. That is, $P_{CMAX,cg}$ is not $P_{CMAX,c}$ for each of the serving cells that belong to the MCG or SCG and means one value for the entirety of the corresponding serving cell.

$PH_{cg}$ means power headroom values for all serving cells that belong to the MCG or SCG. That is, $PH_{cg}$ is not a power headroom value for each of the serving cells that belong to the SCG and means one value for the entirety of the serving cell.

Two types of information of $P_{CMAX,cg}$ and $PH_{cg}$ values may be present according to PUCCH transmission in the MCG or SCG being included. A type considering the PUCCH transmission will be referred to as type 1 and a type not considering the PUCCH transmission will be referred to as type 2. That is, $P_{CMAX,cg}$ includes $P_{CMAX,cg}$ of type 1 and $P_{CMAX,cg}$ of type 2 and $PH_{cg}$ also includes $PH_{cg}$ of type 1 and $PH_{cg}$ of type 2. As such, the information included in the PHR may include not a value for one type but two values such as type 1 and type 2.

The virtual indicator indicates whether transmission in the MCG is performed at the time of the power headroom report. As one example, the virtual indicator as a 1 bit may indicate a situation in which transmission is not performed in all serving cells that belong to the MCG or SCG. When transmission is not performed in all serving cells that belong to the MCG or SCG, the virtual indicator may be set to 1 and when transmission is performed in at least one serving cell among the serving cells that belong to the MCG or SCG, the virtual indicator may be set to 0. As another example, the virtual indicator as a bitmap may directly indicate a serving cell in which transmission is not performed among the serving cells that belong to the MCG or SCG. As yet another example, the virtual indicator may indicate the number of serving cells in which transmission is not performed among the serving cells that belong to the MCG or SCG.

As yet another example of the PHR transmission, the control unit 1110 of the UE 1100 may calculate the power headroom based on virtual transmission and thereafter, transfer power information of all activated serving cells of the master base station to the secondary base station. Calculating the power headroom based on the virtual transmission includes calculating the power headroom by assuming that transmission to the serving cell of the master base station is not performed at the time when the PHR is transmitted. That is, power information of all activated serving cells of the master base station at the corresponding time means that the UE calculates the power headroom by assuming that transmission is not performed regardless of actual transmission being performed.

The UE calculates the power headroom based on a reference establishment at the time of calculating the power headroom based on the virtual transmission. As one embodiment of calculating PUSCH reference transmission power, using an equation given below may be included.

$$P_{PUSCH,c}(i) = \min\{P_{CMAX,c}(i), P_{O\_PUSCH,c}(1) + \alpha_c(1) \cdot PL_c + f_c(i)\}[dBm]$$ [Equation 19]

In Equation 19, $\bar{P}_{CMAX,c}(i)$ is calculated by assuming MPR=0 dB, A-MPR=0 dB, P-MPR=0 dB, and TC=0 dB and calculation is performed by assuming that there is no bandwidth of the PUSCH resource assignment and there is no modulation and coding scheme (MCS) level. That is, 10 $\log_{10}(M_{PUSCH,c}(i))=0$ and $\Delta_{TF,c}(j)=0$ are meant. In Equation 19, $P_{O\_PUSCH,c}(i)$ is a value which the UE is signaled with and when PUSCH transmission is dynamically allocated, j=1 is established. $\alpha_c(j)$ means that when as a scaling-down factor of a path loss value ($PL_{,C}$), j=1, the corresponding value becomes 1, and as a result, the path loss value is not scaled down. $f_c(i)$ is a value applied as an accumulation or non-accumulation value by a TPC command value included in a DCI format.

As another embodiment of calculating PUSCH reference transmission power, using an equation given below is included.

$$P_{PUSCH,c}(i) = \min\{P_{CMAX,c}(i), P_{O\_PUSCH,c}(1) + \alpha_c(1) \cdot PL_c\}[dBm]$$ [Equation 20]

In Equation 20, the value of $f_c(i)$ is established and calculated as 0. Through Equation 16, a pure path loss value which is not influenced by the TPC command may be known. That is, Equation 20 provides a more accurate value in order to observe a progress of the path loss value in each serving cell of the secondary base station.

Further, as one embodiment of calculating PUCCH transmission power, using an equation given below is included.

$$P_{PUCCH}(i) = \min\{P_{CMAX,c}(i), P_{O\_PUCCH} + PL_c + g(i)\}$$ [Equation 21]

In Equation 21, $\bar{P}_{CMAX,c}(i)$ is calculated by assuming MPR=0 dB, A-MPR=0 dB, P-MPR=0 dB, and TC=0 dB and calculation is performed by assuming is that there is no bandwidth of the PUSCH resource assignment and there is no modulation and coding scheme (MCS) level. That is, in Equation 17, the PUCCH transmission power is calculated by assuming $h(n_{CQI}, n_{HARQ}, n_{SR})=0$, $\Delta_{F\_PUCCH}(F)=0$, and $\Delta_{TxD}(F')=0$. $h(n_{CQI}, n_{HARQ}, n_{SR})$ represents a value associated with information bit numbers of CQI, HARQ, and SR. $\Delta_{F\_PUCCH}(F)$ represents a value associated with determination of transmission power depending on a PUCCH format. $\Delta_{TxD}(F')$ represents a value associated with determination of transmission power used when transmit diversity is acquired through two antennas.

As another embodiment of calculating PUCCH transmission power, using an equation given below is included.

$$P_{PUCCH}(i) = \min(P_{CMAX,c}(i), P_{O\_PUCCH} + PL_c)$$ [Equation 22]

Equation 22 is an equation of calculating the PUCCH transmission power by assuming g(i)=0. Through Equation 22, the pure path loss value which is not influenced by the TPC command may be known. That is, Equation 22 provides a more accurate value in order to observe the progress of the path loss value in each serving cell of the secondary base station.

In addition, the secondary base station that receives the PHR determines whether the change of $P_{EMAX,cg}$ (alternatively, $sP_{EMAX}$ or $mP_{EMAX}$) of the UE is required is required (S1405) and transmits a change request of $P_{EMAX}$ to the master base station (MeNB) (S1410).

The change request may indicate that increasing or decreasing the value of $P_{EMAX,cg}$ of the secondary base station is required. The increase or decrease of the $P_{EMAX,cg}$ value may be expressed as the $P_{EMAX,cg}$ value as itself and as a change amount or an increase amount for a current value. Alternatively, the change request may indicate that increasing or decreasing the $P_{EMAX,cg}$ value of the master base station is required. Herein, the increase or decrease of the $P_{EMAX,cg}$ value may be expressed as the $P_{EMAX,cg}$ value as itself and as the change amount or increase amount for a current value.

The master base station that receives the change request may accept the change of the $P_{EMAX,cg}$ value (S1415). In addition, when the master base station accepts the change of the $P_{EMAX,cg}$ value, the master base station transmits a changer response of $P_{EMAX}$ to the secondary base station (S1420). Herein, the change response indicates the change of $P_{EMAX,cg}$ of the secondary base station or the master base station. In this case, although not illustrated, the embodiment may include a method in which the change response is omitted. A meaning that the change response is omitted includes a meaning that the master base station unconditionally accepts the request from the secondary base station.

The master base station reconfigures the change of $P_{EMAX,cg}$ to the UE (S1425). For example, reconfiguring the change of $P_{EMAX,cg}$ in the UE includes a case in which the master base station transmits the upper layer signaling indicating the change of $P_{EMAX,cg}$ to the UE. The upper layer signaling is performed by the transmitting unit 1165 of the base station 1150 and the UE's receiving the upper layer signaling is performed by the is receiving unit 1105 of the UE 1100. Meanwhile, the control unit 1110 of the UE 1100 may establish or reestablish the maximum output power ($P_{CMAX}$) configured in the UE based on the upper layer signaling indicating the change of $P_{EMAX,cg}$ FIG. 15 is a flowchart illustrating a process in which a change establishment is performed when changing $mP_{EMAX}$ and $sP_{EMAX}$ values is required (alternatively, the values are changed) according to yet another example of the present invention.

Figure 15:
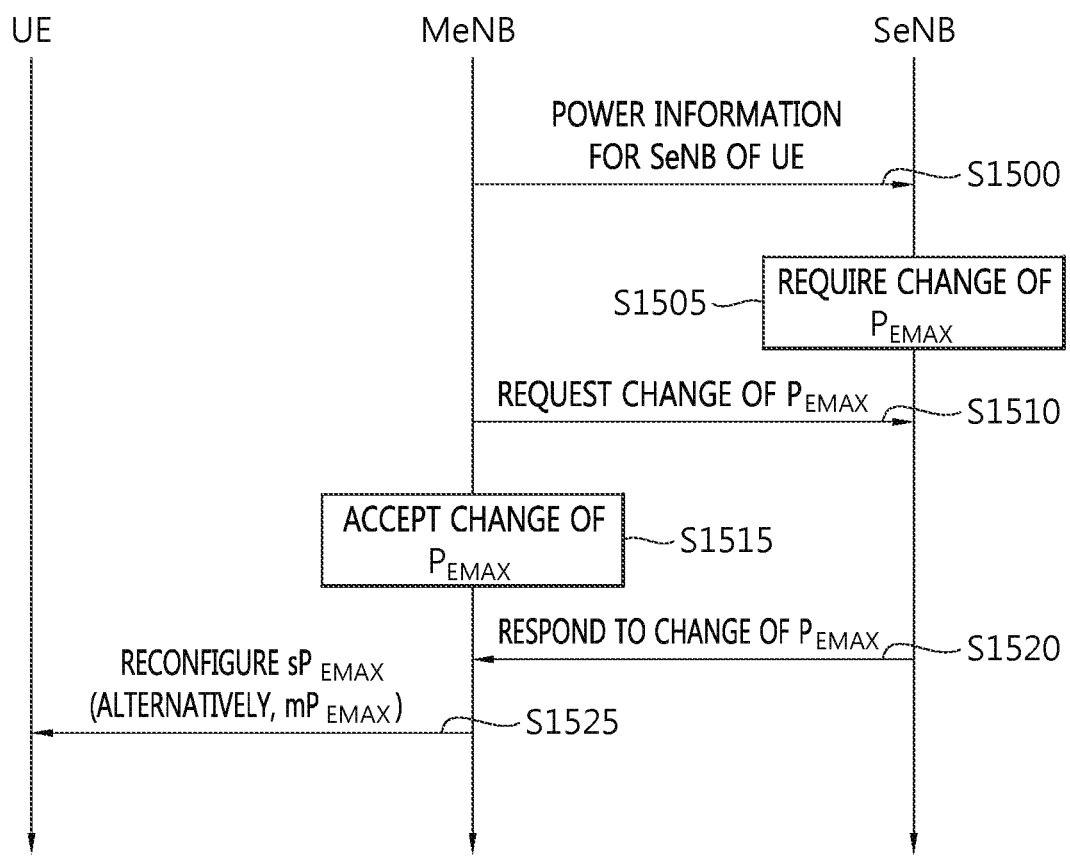
FIG. 15 is a flowchart illustrating a process in which a change configuration is performed when changing $mP_{EMAX}$ and $sP_{EMAX}$ values is required (alternatively, the values are changed) according to still yet another example of the present invention.

Referring to FIG. 15, the master base station calculates power information for the master base station of UE and transmits a report regarding the power information to the secondary base station (S1500). The power information may be calculated by the control unit 1110 of the UE 1100. Meanwhile, the transmitting unit 1115 of the UE 1100 may transmit the PHR. Herein, the power information for the master base station of the UE may include at least one information of $P_{EMAX,cg}$ or $PH_{cg}$ of the master base station and the virtual indicator. Further, the power information may include path loss information for each cell of the master base station or information associated with $f_c(i)$ and $g(i)$ generated by accumulation or non-accumulation by the TPC command. Thereafter, steps S1505 to 1525 may be performed similarly to steps S1405 to S1425 of FIG. 14. The upper layer signaling is performed by the transmitting unit 1165 of the base station 1150 and the UE's receiving the upper layer signaling is performed by the receiving unit 1105 of the UE 1100. Meanwhile, the control unit 1110 of the UE 1100 may establish or reestablish the maximum output power ($P_{CMAX}$) configured in the UE based on the upper layer signaling indicating the change of $P_{EMAX,cg}$.

In the aforementioned illustrated system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The aforementioned embodiments include examples of various aspects. All available combinations for expressing various aspects cannot be described, but it can be recognized by those skilled in the art that other combinations can be used. Therefore, all other substitutions, modifications, and changes of the present invention that belong to the appended claims can be made.

The invention claimed is:

1. A method for establishing maximum transmission power of a user equipment (UE) dually connected to a first base station and a second base station, the method comprising:
   receiving a radio resource control (RRC) message including a UE-specific maximum transmission power value established in the first base station as $mP_{EMAX}$ or the second base station as $sP_{EMAX}$, the first and the second base stations being connected through a backhaul;
   reestablishing maximum output power based on the received UE-specific maximum transmission power value by establishing $P_{CMAX}$; and
   simultaneously transmitting an uplink to the first base station and the second base station within the reestablished maximum output power $P_{CMAX}$,
   wherein the UE-specific maximum transmission power value is established for each of the first base station and the second base station, and
   wherein:

$$P_{CMAX\_L\_DU} \leq P_{CMAX} \leq P_{CMAX\_H\_DU} \quad \text{(equation 12)}$$

$$\begin{aligned} P_{CMAX\_L\_DU} = &\mathrm{MIN}(10\log_{10}\Sigma kp_{EMAX,c} - \Delta T_C, \\ &P_{POWERCLASS} - \mathrm{MAX}(MPR + A - MPR, P - MPR) - \\ &\Delta T_C) \end{aligned} \quad \text{(equation 13)}$$

$$P_{CMAX\_H\_DU} = \mathrm{MIN}(10\log_{10}\Sigma kp_{EMAX,c}, P_{POWERCLASS}) \quad \text{(equation 14)}$$

wherein $P_{POWERCLASS}$ is a parameter indicating the capability of the UE,
   MPR represents a power reduction value established in a range to satisfy requirements established by considering a corresponding band and modulation in the UE,
   A-MPR is a value established by the UE in a range indicated by the first or second base station,
   P-MPR represents maximum output power reduction permitted by considering a case in which a non-LTE system is used,
   $\Delta T_c$ represents a fixed power offset value and a function of a transmission bandwidth for a component carrier,
   $kP_{EMAX}$ is a value transmitted to the UE through the RRC dedicated signaling for each serving cell of the UE, with $1 \leq k \leq n$ and n represents a number of serving base stations,
   $kp_{EMAX}$ is a linear value of $kP_{EMAX}$, and
   dP-Max is a value allocated to the UE and a value transmitted to the UE through the RRC dedicated signaling for each cell.

2. The method of claim 1, wherein a sum of the UE-specific maximum transmission power value for the first base station and the UE-specific maximum transmissions power value for the second base station is established to be equal to or smaller than the maximum output power of the UE.

3. The method of claim 1, wherein the UE-specific maximum transmission power values are parameters determined for each cell and having different values for each UE.

4. The method of claim 1, further comprising:
   receiving an indicator indicating that the UE is dually connected,
   wherein the indicator is received and the UE-specific maximum transmission power values are received from the base station.

5. The method of claim 4, wherein the UE-specific maximum transmission power value is initially established as a value which is the same as a maximum output power value before receiving the indicator.

6. A user equipment (UE) dually connected to a first base station and a second base station and establishing maximum output power, the UE comprising:
  a receiving unit receiving a radio resource control (RRC) message including a UE-specific maximum transmission power value established in the first base station as $mP_{EMAX}$ or the second base station as $sP_{EMAX}$, the first and the second base stations being connected through a backhaul;
  a control unit reestablishing maximum output power based on the received UE-specific maximum transmission power value by establishing $P_{CMAX}$; and
  a transmitting unit simultaneously transmitting an uplink to the first base station and the second base station within the reestablished maximum output power $P_{CMAX}$,
  wherein the UE-specific maximum transmission power value is established for each of the first base station and the second base station, and
  wherein:

$$P_{PCMAX\_L\_DU} \leq P_{CMAX} \leq P_{CMAX\_H\_DU} \quad \text{(equation 12)}$$

$$P_{CMAX\_L\_DU} = \text{MIN}(10 \log_{10} \Sigma kp_{EMAX,c} - \Delta T_C, P_{POWERCLASS} - \text{MAX}(MPR+A-MPR,P-MPR) - \Delta T_C) \quad \text{(equation 13)}$$

$$P_{CMAX\_H\_DU} = \text{MIN}(10 \log_{10} \Sigma kp_{EMAX,c}, P_{POWERCLASS}) \quad \text{(equation 14)}$$

wherein $P_{POWERCLASS}$ is a parameter indicating the capability of the UE,
  MPR represents a power reduction value established in a range to satisfy requirements established by considering a corresponding band and modulation in the UE,
  A-MPR is a value established by the UE in a range indicated by the first or second base station,
  P-MPR represents maximum output power reduction permitted by considering a case in which a non-LTE system is used,
  $\Delta T_c$ represents a fixed power offset value and a function of a transmission bandwidth for a component carrier,
  $kP_{EMAX}$ is a value transmitted to the UE through the RRC dedicated signaling for each serving cell of the UE, with 1≤k≤n and n represents a number of serving base stations,
  $kp_{EMAX}$ is a linear value of $kP_{EMAX}$, and
  dP-Max is a value allocated to the UE and a value transmitted to the UE through the RRC dedicated signaling for each cell.

7. The UE of claim 6, wherein the sum of the UE-specific maximum transmission power value for the first base station and the UE-specific maximum transmissions power value for the second base station is established to be equal to or smaller than the maximum output power of the UE.

8. The UE of claim 6, wherein the UE-specific maximum transmission power values are parameters determined for each cell and having different values for each UE.

9. The UE of claim 6, wherein the receiving unit further receives an indicator indicating that the UE is dually connected and receives the indicator and receives the UE-specific maximum transmission power value from the base station.

10. The UE of claim 9, wherein the control unit initially establishes the UE-specific maximum transmission power value as a value which is the same as a maximum output power value before receiving the indicator.

11. A method for establishing maximum transmission power of a user equipment (UE) which is dually connected to a first base station and a second base station, the method comprising:
  calculating power headroom for the second base station, the first and the second base stations being connected through a backhaul;
  transmitting a report of the power headroom to the first base station; and
  receiving from the first base station upper layer signaling indicating a change of a UE-specific maximum transmission power value for a serving cell group (CG) provided by at least one of the first base station and the second base station,
  wherein the report of the power headroom indicates power headroom value for all serving cells that belong to the CG, and
  a change of the UE-specific maximum transmission power value is determined based on the power headroom, and
  further comprising establishing or reestablishing maximum output power ($P_{CMAX}$) configured in UE based on the upper layer signaling indicating the change of the UE-specific maximum transmission power value, wherein:

$$P_{PCMAX\_L\_DU} \leq P_{CMAX} \leq P_{CMAX\_H\_DU} \quad \text{(equation 12)}$$

$$P_{CMAX\_L\_DU} = \text{MIN}(10 \log_{10} \Sigma kp_{EMAX,c} - \Delta T_C, P_{POWERCLASS} - \text{MAX}(MPR+A-MPR,P-MPR) - \Delta T_C) \quad \text{(equation 13)}$$

$$P_{CMAX\_H\_DU} = \text{MIN}(10 \log_{10} \Sigma kp_{EMAX,c}, P_{POWERCLASS}) \quad \text{(equation 14)}$$

wherein $P_{POWERCLASS}$ is a parameter indicating the capability of the UE,
  MPR represents a power reduction value established in a range to satisfy requirements established by considering a corresponding band and modulation in the UE,
  A-MPR is a value established by the UE in a range indicated by the first or second base station,
  P-MPR represents maximum output power reduction permitted by considering a case in which a non-LTE system is used,
  $\Delta T_c$ represents a fixed power offset value and a function of a transmission bandwidth for a component carrier,
  $kP_{EMAX}$ is a value transmitted to the UE through a radio resource control RRC dedicated signaling for each serving cell of the UE, with 1≤k≤n and n represents a number of serving base stations,
  $kp_{EMAX}$ is a linear value of $kP_{EMAX}$, and
  dP-Max is a value allocated to the UE and a value transmitted to the UE through the RRC dedicated signaling for each cell.

12. The method of claim 11, wherein in the calculating of the power headroom, the power headroom is calculated based on virtual transmission on activated serving cells provided by the second base station.

13. The method of claim 12, wherein the virtual transmission is used to calculate the power headroom by assuming that transmission is not performed on the serving cell of the second base station at the time when the power headroom is reported.

14. A user equipment (UE) dually connected to a first base station and a second base and establishing maximum transmission power, the UE comprising:

a control unit calculating power headroom for the second base station, the first and the second base stations being connected through a backhaul;
a transmitting unit transmitting a report of the power headroom to the first base station; and
a receiving unit receiving from the first base station upper layer signaling indicating a change of a UE-specific maximum transmission power value for a serving cell group (CG) provided by at least one of the first base station and the second base station,
wherein the report of the power headroom indicates power headroom value for all serving cells that belong to the CG, and
a change of the UE-specific maximum transmission power value is determined based on the power headroom,
and further comprising establishing or reestablishing maximum output power ($P_{CMAX}$) configured in UE based on the upper layer signaling indicating the change of the UE-specific maximum transmission power value,
wherein:

$$P_{CMAX\_L\_DU} \leq P_{CMAX} \leq P_{CMAX\_H\_DU} \quad \text{(equation 12)}$$

$$P_{CMAX\_L\_DU} = \text{MIN}(10 \log_{10} \Sigma kp_{EMAX,c} - \Delta T_C, P_{POWERCLASS} - \text{MAX}(MPR + A - MPR, P - MPR) - \Delta T_C) \quad \text{(equation 13)}$$

$$P_{CMAX\_H\_DU} = \text{MIN}(10 \log_{10} \Sigma kp_{EMAX,c}, P_{POWERCLASS}) \quad \text{(equation 14)}$$

wherein $P_{POWERCLASS}$ is a parameter indicating the capability of the UE,
MPR represents a power reduction value established in a range to satisfy requirements established by considering a corresponding band and modulation in the UE,
A-MPR is a value established by the UE in a range indicated by the first or second base station,
P-MPR represents maximum output power reduction permitted by considering a case in which a non-LTE system is used,
$\Delta T_c$ represents a fixed power offset value and a function of a transmission bandwidth for a component carrier,
$kP_{EMAX}$ is a value transmitted to the UE through a radio resource control (RRC) dedicated signaling for each serving cell of the UE, with $1 \leq k \leq n$ and n represents a number of serving base stations,
$kp_{EMAX}$ is a linear value of $kP_{EMAX}$, and
dP-Max is a value allocated to the UE and a value transmitted to the UE through the RRC dedicated signaling for each cell.

15. The UE of claim 14, wherein the control unit calculates the power headroom based on virtual transmission on activated serving cells provided by the second base station.

16. The UE of claim 15, wherein the virtual transmission is used to calculate the power headroom by assuming that transmission is not performed on the serving cell of the second base station at the time when the power headroom is reported.

* * * * *